United States Patent
Lee et al.

(10) Patent No.: US 11,960,343 B2
(45) Date of Patent: Apr. 16, 2024

(54) REMOTE CONTROLLER AND CONTROLLING METHOD THEREOF

(71) Applicant: SAMSUNG ELECTRONICS CO., LTD., Suwon-si (KR)

(72) Inventors: Wonjae Lee, Suwon-si (KR); Hyunkyu Yun, Suwon-si (KR); Minsup Kim, Suwon-si (KR); Sukhoon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 17/311,096

(22) PCT Filed: May 4, 2021

(86) PCT No.: PCT/KR2021/005579
§ 371 (c)(1),
(2) Date: Jun. 4, 2021

(87) PCT Pub. No.: WO2022/186424
PCT Pub. Date: Sep. 9, 2022

(65) Prior Publication Data
US 2023/0350478 A1 Nov. 2, 2023

(30) Foreign Application Priority Data
Mar. 5, 2021 (KR) .................. 10-2021-0029664

(51) Int. Cl.
*G06F 1/3215* (2019.01)
*H02J 7/00* (2006.01)
(52) U.S. Cl.
CPC ........ *G06F 1/3215* (2013.01); *H02J 7/00306* (2020.01)

(58) Field of Classification Search
CPC ........................ G06F 1/3215; H02J 7/00306
(Continued)

(56) References Cited

U.S. PATENT DOCUMENTS 5,300,875 A * 4/1994 Tuttle .................... G01S 13/767
320/138
5,457,447 A * 10/1995 Ghaem ................ H04B 1/1607
340/693.1
(Continued)

FOREIGN PATENT DOCUMENTS

JP 11-41670 2/1999
JP 2011-103729 A 5/2011
(Continued)

OTHER PUBLICATIONS

International Search Report for International Application No. PCT/KR2021/005579 dated Dec. 15, 2021.
(Continued)

*Primary Examiner* — Paul R. Myers
(74) *Attorney, Agent, or Firm* — STAAS & HALSEY LLP

(57) ABSTRACT

A remote controller enabled to control an external device includes a communication interface to communicate with the external device, an energy harvester to obtain an electrical energy, a power supplier to receive supply of the electrical energy from the energy harvester, and a processor configured to, based on a supply voltage of the power supplier being greater than or equal to a first threshold value and less than a second threshold value, control the communication interface to release communication connection established to communicate with the external device, and supply the electrical energy obtained by the energy harvester to the power supplier.

17 Claims, 21 Drawing Sheets

(58) Field of Classification Search
USPC .................................................. 713/300–340
See application file for complete search history.

(56) References Cited

U.S. PATENT DOCUMENTS

| | | | | |
|---|---|---|---|---|
| 5,583,491 A * | 12/1996 | Kim | ....................... | H04N 21/47 348/E5.103 |
| 5,650,831 A * | 7/1997 | Farwell | .................. | H04N 21/47 348/E5.103 |
| 5,974,551 A * | 10/1999 | Lee | ....................... | G06F 1/3246 713/323 |
| 6,690,721 B1 * | 2/2004 | Murphy | ................ | H04L 1/0003 370/252 |
| 6,763,470 B1 * | 7/2004 | Bell | ..................... | H03G 1/0088 713/323 |
| 6,782,484 B2 * | 8/2004 | McGowan | ............ | G06F 1/3215 710/52 |
| 6,854,066 B1 * | 2/2005 | LeFevre | .................... | G06F 1/26 320/135 |
| 7,017,061 B2 * | 3/2006 | Lippert | ..................... | G06F 1/30 713/340 |
| 7,596,705 B2 * | 9/2009 | Kim | ....................... | G06F 1/3228 713/320 |
| 7,698,578 B2 * | 4/2010 | Williams | ............. | H03G 3/3042 713/323 |
| 9,426,748 B2 | 8/2016 | Taha et al. | | |
| 9,948,113 B2 * | 4/2018 | Hall | ........................ | H02J 7/345 |
| 11,171,495 B2 | 11/2021 | Nam et al. | | |
| 2002/0113574 A1 * | 8/2002 | Mashiko | ............... | H02J 7/0031 320/128 |
| 2006/0220467 A1 * | 10/2006 | Lin | ......................... | H02J 9/005 307/66 |
| 2007/0296701 A1 * | 12/2007 | Pope | ..................... | G06F 1/3271 345/168 |
| 2008/0055092 A1 * | 3/2008 | Burr | ....................... | H01Q 1/248 340/693.1 |
| 2008/0252432 A1 * | 10/2008 | Hein | ..................... | G08C 17/02 429/162 |
| 2009/0174361 A1 * | 7/2009 | Duron | ...................... | H02J 5/00 320/101 |
| 2010/0141153 A1 * | 6/2010 | Recker | .................. | H05B 45/357 315/149 |
| 2011/0109201 A1 | 5/2011 | Ozawa et al. | | |
| 2011/0136442 A1 * | 6/2011 | Beals | .................... | H04L 63/102 455/73 |
| 2011/0199026 A1 * | 8/2011 | Forrest | ...................... | H02J 7/35 320/101 |
| 2012/0187897 A1 * | 7/2012 | Lenk | ................... | H02J 7/00308 320/101 |
| 2012/0284552 A1 * | 11/2012 | Archer, Jr. | ............ | G06F 1/3203 713/324 |
| 2013/0082657 A1 * | 4/2013 | Rich | ...................... | H02N 2/186 320/137 |
| 2013/0132010 A1 * | 5/2013 | Winger | ................ | G01R 31/382 702/63 |
| 2014/0375261 A1 * | 12/2014 | Manova-Elssibony | ..................... | H02J 50/80 320/108 |
| 2015/0006937 A1 * | 1/2015 | Rotem | .................. | G06F 1/3215 713/324 |
| 2015/0115867 A1 * | 4/2015 | Chang | ....................... | H02J 7/35 320/101 |
| 2015/0244165 A1 * | 8/2015 | Roesner | ................ | H02H 3/087 361/79 |
| 2015/0371534 A1 * | 12/2015 | Dimberg | ................ | G08C 17/02 340/12.5 |
| 2016/0028344 A1 * | 1/2016 | Kusakawa | .......... | H02J 7/00304 318/139 |
| 2016/0349843 A1 | 12/2016 | Kwon et al. | | |
| 2017/0077841 A1 * | 3/2017 | Yun | .......................... | H02N 1/08 |
| 2019/0363549 A1 | 11/2019 | Nam et al. | | |

FOREIGN PATENT DOCUMENTS

| | | |
|---|---|---|
| KR | 10-2014-0086937 A | 7/2014 |
| KR | 10-1600287 | 3/2016 |
| KR | 10-2016-0139934 A | 12/2016 |
| KR | 10-2019-0031392 A | 3/2019 |
| KR | 10-2138470 B1 | 7/2020 |
| KR | 10-2165493 | 10/2020 |

OTHER PUBLICATIONS

Written Opinion International Application No. PCT/KR2021/005579 dated Dec. 15, 2021.

Nico N. Encarnacion et al., "On the Performance Evaluation of Energy-Aware Sleep Scheduling (EASS) in Energy Harvesting WSN (EH-WSN)", Inf. Commun. Converg. Eng. 10(3), Sep. 2012, pp. 264-268.

* cited by examiner

FIG. 7

| SUPPLY VOLTAGE | STATE | BATTERY USAGE TIME RATIO | OPERATION |
|---|---|---|---|
| V7~V8 | FULLY CHARGED | ~11% | GENERAL OPERATION |
| V6~V7 | NORMAL 3 | 12%~39% | GENERAL OPERATION |
| V5~V6 | NORMAL 2 | 40%~67% | GENERAL OPERATION |
| V4~V5 | NORMAL 1 | 68%~89% | GENERAL OPERATION |
| V3~V4 | LOW CHARGE | 90%~94% | DISPLAY GUIDE UI FOR REQUESTING CHARGING TO EXTERNAL DEVICE |
| V2~V3 | BATTERY CUTOFF | 95%~ | DISPLAY GUIDE UI FOR REQUESTING CHARGING TO EXTERNAL DEVICE UPON RECEIVING USER INPUT |
| V1~V2 | SLEEP MODE NECESSARY | 95%~ | RELEASE COMMUNICATION CONNECTION WITH EXTERNAL DEVICE AND OPERATE ENERGY HARVESTER |
| LESS THAN V1 | OVER-DISCHARGE | 95%~ | – |

705

REMOTE CONTROLLER AND CONTROLLING METHOD THEREOF

CROSS-REFERENCE TO RELATED APPLICATIONS

This application is a U.S. National Stage Application, which claims the benefit under U.S.C. § 371 of International Patent Application No. PCT/KR2021/005579, filed on May 4, 2021, which claims the priority benefit of Korean Patent Application No. 10-2021-0029664, filed on Mar. 5, 2021 in the Korean Patent and Trademark Office, the disclosures of which are hereby incorporated by reference in their entirety.

BACKGROUND

Field

This disclosure relates to a remote controller and a controlling method thereof and, more particularly, to a remote controller providing energy using an energy harvester and a controlling method thereof.

Description of the Related Art When over-discharged, a battery associated with a secondary battery that may be charged or discharged may have deteriorated battery performance or shortened lifetime.

Therefore, an electronic device may cut off power of the battery so that the battery is discharged to be in an over-discharge state. The electronic device may cut off power supply to various modules that consume power in the electronic device when the power of the battery is automatically cut off. The electronic device may use an over-discharge protection circuit (e.g., a charging termination circuit) or a protection circuit module to automatically cut off power supply.

Despite the above function, if a new power is not supplied, there may be a problem in that the battery is over-discharged consequently.

A secondary battery may be separately installed to avoid an over-discharge state of the battery. However, the secondary battery may also be discharged, and a cost problem or a space arrangement problem due to installation of the secondary battery may occur.

SUMMARY

It is an object of the disclosure to provide a remote controller which measures a voltage of a battery and supply power to a power supplier using an energy harvester when the measured voltage is within a threshold range, and a controlling method thereof.

A remote controller to control an external device according to an embodiment may include a communication interface to communicate with the external device, an energy harvester to obtain an electrical energy, a power supplier to receive supply of the electrical energy from the energy harvester, and a processor configured to, based on a supply voltage of the power supplier being greater than or equal to a first threshold value and less than a second threshold value, control the communication interface to release a communication connection established to communicate with the external device, and supply the electrical energy obtained (or generated) by the energy harvester to the power supplier.

A method of a remote controller to control an external device according to an embodiment may include, obtaining a supply voltage of a power supplier included in the remote control, based on the supply voltage of the power supplier being greater than or equal to a first threshold value and less than a second threshold value, releasing a communication connection established to communicate with the external device and supplying an electrical energy obtained (or generated) by an energy harvester included in the remote controller to the power supplier.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 7 is a diagram illustrating various power modes of a remote controller according to an embodiment;

DETAILED DESCRIPTION

Herein below, various embodiments of the disclosure will be described with reference to drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

It is to be understood that terms such as "comprise" or "consist of" are used herein to designate a presence of a characteristic, number, step, operation, element, component, or a combination thereof, and not to preclude a presence of additional characteristics.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

In the disclosure, a "user" may refer to a person using an electronic apparatus or an artificial intelligence electronic apparatus using an electronic apparatus (e.g., artificial intelligence electronic device).

The disclosure will be described in greater detail with reference to the attached drawings.

Figure 1:
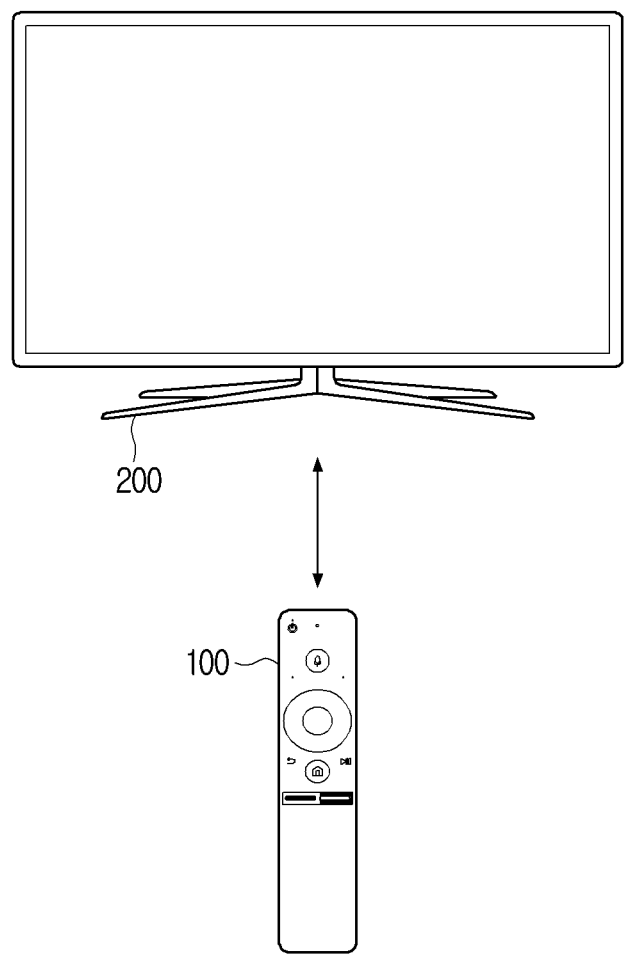
FIG. 1 is a diagram illustrating a system including a remote controller and an external device.

FIG. 1 is a diagram illustrating a system including a remote controller and an external device.

Referring to FIG. 1, a remote controller 100 may remotely control an external device 200. The remote controller 100 may control the external device 200 using a wireless communication method. The remote controller 100 may refer to a control device corresponding to the external device 200. The wireless communication method may be a Bluetooth method, a Wi-Fi method, or an infrared communication method. When the remote controller 100 receives a user input for controlling the external device 200, the remote controller 100 may generate (or obtain) a control signal corresponding to the received user input and may transmit the generated control signal to the external device 200.

The external device 200 may perform an operation corresponding to the control signal based on the control signal received from the remote controller 100. The external device 200 may refer to various devices controlled by the remote controller 100. The external device 200 may refer to an electronic device including a display, and may refer to an output device including a speaker. The external device 200, for example, may be implemented as at least one of smartphones, tablet PCs, mobile phones, video telephones, electronic book readers, desktop personal computers (PCs), laptop PCs, netbook computers, workstations, servers, a portable digital assistant (PDA), a portable multimedia player (PMP), an MP3 player, a medical device, a camera, or a wearable device. A wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., a skin pad or a tattoo); or a bio-implantable circuit. In some embodiments, the electronic device may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, or an electronic frame.

The remote controller 100 according to an embodiment may not use an energy harvester 120 when the power supply of the battery is cut off based on an over-discharge protection circuit. Even though power is to be supplied from the energy harvester 120, a voltage higher than a voltage supplied by the energy harvester 120 is required after the battery is cut off by the over-discharge protection circuit.

For example, when the measured supply voltage of the battery falls below 2.7 V, the over-discharge protection circuit may operate, and the power supply of the battery may be cut off. When the over-discharge protection circuit operates, a main function of the remote controller 100 including the battery may not operate. The supply voltage may refer to a voltage supplied by the battery, and may be described as a measured voltage, a cell voltage, or a battery voltage.

If the main function of the remote controller 100 is to be used again, the operation of the over-discharge protection circuit needs to be stopped or released. In order to stop or release the operation of the over-discharge protection circuit, a voltage (or instantaneous voltage) greater than or equal to a specific voltage value (or instantaneous voltage value) should be supplied. The specific voltage value (or instantaneous voltage value) may be 3.6 V which is greater than 2.7 V. Therefore, when the over-discharge protection circuit is already operated, a voltage (or instantaneous voltage) of 3.6V or more should be supplied, so that the operation of the over-discharge protection circuit may be stopped or released.

When the remote controller 100 is to be charged through the energy harvesting operation during the operation of the over-discharge protection circuit, there may be a problem that the supply voltage (or instantaneous voltage value) is low and charging is not available.

The energy harvesting operation may refer to an operation of converting energy generated from a natural energy source into electrical energy and obtaining the electrical energy. For example, the energy harvesting operation may refer to an operation of obtaining electrical energy from a natural energy source such as sunlight, vibration, heat, wind power, or the like. The energy harvesting operation may include body energy harvesting, thermal energy harvesting, electromagnetic energy harvesting, vibration energy harvesting, gravity energy harvesting, potential energy harvesting, optical energy harvesting, or the like.

The energy harvesting operation may not have a high supply voltage (or instantaneous voltage value), unlike general wired charging. Thus, the measured supply voltage (or instantaneous voltage value) by the energy harvesting operation may be equal to or below 3.6 V. Even if the energy harvesting operation is performed during operation of the over-discharge protection circuit, the operation of the over-discharge protection circuit may not be stopped or released. If the operation of the over-discharge protection circuit is not stopped or released, charging by the energy harvesting operation may not be possible and electrical energy generated by the energy harvesting operation may be wasted. Accordingly, this disclosure may have necessity to supply electrical energy in advance by energy harvesting operation prior to operation of the over-discharge protection circuit.

Figure 2:
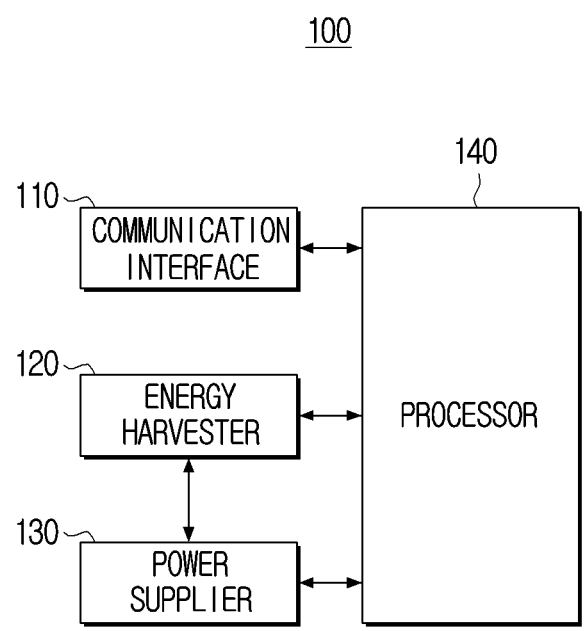
FIG. 2 is a block diagram illustrating a remote controller according to an embodiment.

FIG. 2 is a block diagram illustrating a remote controller according to an embodiment.

Referring to FIG. 2, the remote controller 100 may include a communication interface 110, an energy harvester 120, a power supplier 130, and a processor 140.

The communication interface 110 performs communication with various types of external devices according to various types of communication methods. The communication interface 110 may include a Wi-Fi module, a Bluetooth module, an infrared ray communication module, a wireless communication module, or the like. The Wi-Fi module and Bluetooth module may perform communication by Wi-Fi method and Bluetooth method, respectively. The wireless communication module may include at least one chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods described above.

An energy harvester 120 is configured to convert energy generated (or obtained) from a natural energy source into electrical energy and obtain the energy. The energy harvester 120 may include an energy generation module, an energy conversion module, and an energy storage module to perform a self-power generation function. The energy harvester 120 may supply electrical energy stored in the energy storage module to the power supplier 130 of the remote controller 100.

The power supplier 130 may supply power to various configurations included in the remote controller 100. The power supplier 130 may include a battery in which charging and discharging are performed. The charging of the battery may be performed by wired charging or an energy harvesting operation. The power supplier 130 may supply power directly to various configurations included in the remote controller 100. According to an embodiment, the power supplier 130 may supply power to various configurations included in the remote controller 100 through the processor 140.

The processor 140 may perform an overall control operation of the remote controller 100. The processor 140 may perform a function to control overall operations of the remote controller 100.

The processor 140 may be implemented with at least one of a digital signal processor (DSP), a microprocessor, and a time controller (TCON). The processor 140 is not limited thereto and may include at least one or more of a central processing unit (CPU), a micro controller unit (MCU), a micro processing unit, a controller, an application processor (AP), a communication processor (CP), and an advanced reduced instruction set computing (RISC) machine (ARM) processor or may be defined as a corresponding term. The processor 140 may be implemented in a system on chip (SoC) type or a large scale integration (LSI) type in which a processing algorithm is built therein or in a field programmable gate array (FPGA) type. The processor 140 may perform various functions by executing computer executable instructions stored in a memory.

The processor 140, if the supply voltage of the power supplier 130 is greater than or equal to a first threshold value and less than a second threshold value, may control the communication interface 110 to release communication connection with the external device 200 and may supply the electrical energy generated by the energy harvester 120 to the power supplier 130.

The processor 140 may measure (or identify) supplied power of the power supplier 130. The processor 140 may obtain supplied power of the power supplier 130. The processor 140 may identify a state of the remote controller 100 based on the obtained supply voltage, and may perform an operation corresponding to the identified state of the remote controller 100. A specific operation will be described with reference to FIG. 7 below.

The processor 140 may perform an operation corresponding to the measured (identified or obtained) supply voltage. If the measured supply voltage is greater than or equal to a first threshold value and the measured supply voltage is less than a second threshold value, the processor 140 may change a mode so that the remote controller 100 operates in a sleep mode.

The sleep mode may denote a mode of reducing power supply of the power supplier 130 and operating the energy harvester 120.

In order to reduce the power supply of the power supplier 130, the processor 140 may release the communication connection with the external device 200. The operation of releasing the communication connection may mean disconnection of a communication session established between the remote controller 100 and the external device 200. The processor 140 may control the power supplier 130 so as not to supply power to the communication interface 110 after releasing the communication connection with the external device 200.

The processor 140 may operate the energy harvester 120 while releasing communication connection with the external device 200. Here, operating the energy harvester 120 may mean an operation of obtaining energy that is self-generated. For example, the energy harvesting operation by the energy harvester 120 may mean that the remote controller 100 itself obtains electrical energy without a separate power supply source.

According to an embodiment, an energy harvesting operation may denote an operation of obtaining electrical energy using solar heat. The remote controller 100 may include a circuit for obtaining solar heat and converting the solar heat into electrical energy, and may supply (or provide) power to the power supplier 130 by using solar heat.

According to another embodiment, the energy harvesting operation may denote an operation of obtaining electrical energy using vibration energy. The remote controller 100 may include a circuit for converting vibration energy into electrical energy, and may provide electrical energy generated by the movement of the remote controller 100 to the power supplier 130. For example, the processor 140 may provide electrical energy generated by the vibration energy from the energy harvester 120 to the power supplier 130 when the user performs various actions that cause the remote controller 100 to rotate or free fall.

The processor 140 may control the over-discharge protection circuit included in the power supplier 130 to cut off power supply of the power supplier 130 if the supply voltage of the power supplier 130 is less than a first threshold value after communication connection is released.

The operation of cutting off the power supplier of the power supplier 130 may mean that the power supplier 130 does not supply power to any hardware. In general, when the battery is fully discharged, the performance of the battery may be changed, and battery performance such as the charging capacity of the battery may be deteriorated. Therefore, if the supply voltage is less than the first threshold value, the processor 140 may cut off the power supply of the power supplier 130 to protect the battery. The processor 140 may cut off the power supply of the power supplier 130 using the over-discharge protection circuit. When the over-discharge protection circuit is operated, the discharge of the battery may be restrained as much as possible.

The remote controller 100 may further include a manipulation interface 150, and the processor 140 may transmit, to the external device 200 through the communication interface 110, a signal to indicate a guide UI in relation to (or requesting) charging of the power supplier 130 of the remote controller 100 to the display of the external device 200 based on the user input received via the manipulation interface 150 if the supply voltage is greater than or equal to the second threshold and less than the third threshold.

The user input may mean an input for selecting one of a plurality of physical buttons included in the remote controller 100. For example, if a user input is received in a state where the supply voltage is greater than or equal to the second threshold and the supply voltage is less than the third threshold, the processor 140 may control the external device 200 to display a guide UI that requests charging to the display of the external device 200. The detailed operation related thereto will be described later with reference to FIG. 12. The configuration related to the guide UI will be described later in FIG. 13.

In the embodiment described above, an operation of outputting guide audio requesting charging to the speaker of the external device 200 may replace an operation of displaying a guide UI requesting charging to the display of the external device 200.

The processor 140, if the supply voltage is greater than or equal to a third threshold value and less than a fourth threshold value, may transmit, to the external device 200 through the communication interface 110, a signal to display the guide UI requesting charging to the display.

The processor 140 may control the external device 200 such that the guide UI is displayed on the external device 200 while it is identified that the supply voltage is greater than or equal to the third threshold and the supply voltage is less than the fourth threshold. The processor 140 may transmit a control signal for controlling the external device 200 to repeatedly display the charging request guide UI to the external device 200. The specific operation related thereto will be described later with reference to FIG. 14.

In a first embodiment where the supply voltage is greater than or equal to the second threshold value and less than the third threshold value, the guide UI is displayed only in the case where the user input is received. In a second embodiment where the supply voltage is greater than or equal to the third threshold value and less than the fourth threshold value, the guide UI is displayed regardless of the user input. Since the supply voltage of the second embodiment is higher, the charging capacity may be relatively sufficient. The processor 140 may repeatedly transmit a control signal to the external device 200 in the second embodiment to continuously display the guide UI on the external device 200. However, since the power consumption should be reduced as much as possible in the supply voltage (greater than or equal to the second threshold value and less than the third threshold value) corresponding to the first embodiment, the control signal may not be repeatedly transmitted. Therefore, in the first embodiment, a control signal may be transmitted to the external device 200 only when the user input is received.

If the supply voltage of the power supplier 130 is greater than or equal to a fourth threshold value after communication connection is released, the processor 140 may control the communication interface 110 to re-perform (or re-establish) communication connection with the external device 200.

The processor 140 may release the communication connection with the external device 200 when the supply voltage is identified to be greater than or equal to the first threshold and less than the second threshold. The processor 140 may re-measure the supply voltage of the power supplier 130 after a threshold time elapses. If the re-measured supply voltage is greater than or equal to the fourth threshold value, the processor 140 may re-perform the communication connection with the external device 200. The detailed operation related thereto will be described later with reference to FIG. 15.

The remote controller 100 may further include a manipulation interface 150, and the processor 140 may control the communication interface 110 to release the communication connection with the external device 200 if the user input is not received through the manipulation interface 150 for a threshold time, and may supply the electrical energy generated by the energy harvester 120 to the power supplier 130.

The processor 140, if it is identified that a pre-determined event occurs, may control the remote controller 100 to operate in a sleep mode. A plurality of pre-determined events to operate in a sleep mode will be described in FIG. 9.

The pre-determined event according to an embodiment may be an event in which supply voltage is greater than or equal to a first threshold value and less than a second threshold value.

A predetermined event according to another embodiment may be an event that a user input is not received for a threshold time. If the user input is not received for a threshold time, the processor 140 may control the remote controller 100 to operate in a sleep mode to minimize power of the battery.

The pre-determined event according to a still another embodiment may be an event of identifying that the power of the external device 200 is turned off.

When it is identified that the external device 200 is powered off, the processor 140 may control the communication interface 110 to release the communication connection with the external device 200, and may supply the electrical energy generated by the energy harvester 120 to the power supplier 130.

According to an embodiment, the processor 140 may receive a signal from the external device 200 and identify whether the external device 200 is powered off. For example, if the user turns off the power of the external device 200 through the physical button of the external device 200, the external device 200 may transmit a power-off signal to the remote controller 100. The remote controller 100 may identify that the external device 200 is powered off based on the received power-off signal. The remote controller 100 may control the remote controller 100 to operate in a sleep mode based on a power-off signal received from the external device 200.

According to another embodiment, the remote controller 100 may directly receive a power off command of the external device 200.

The remote controller 100 may further include a manipulation interface 150, and the processor 140 may generate a signal for turning off the power of the external device 200 based on the user input received through the manipulation interface 150, and may transmit the generated signal to the external device 200 through the communication interface 110.

After the generated signal is transmitted to the external device 200, the communication interface 110 may be controlled to release communication connection with the external device 200, and the electrical energy generated by the energy harvester 120 may be provided to the power supplier 130.

A detailed description will be given with reference to FIG. 16 below.

The processor 140 may include a communication control module and a power control module, and the communication control module may transmit a signal corresponding to the user input to the external device 200 through the communication interface 110, and the power control module may control the electrical energy generated from the energy harvester 120 to be supplied to the power supplier 130.

A detailed description will be given with reference to FIG. 4 below.

The processor 140 may control the over-discharge protection circuit included in the power supplier 130 to cut off the power supply of the power supplier 130 when the first supply voltage of the power supplier 130 is greater than the second supply voltage of the power supplier 130 obtained before the electrical energy generated from the energy harvester 120 is supplied to the power supplier 130 is greater than the second supply voltage of the power supplier 130 obtained after the threshold time from the time when the electrical energy generated from the energy harvester 120 is supplied to the power supplier 130. The detailed description related thereto will be described later with reference to FIG. 10.

The processor 140 may charge the battery based on the electrical energy generated by the energy harvester 120 after the energy harvester 120 is operated. The processor 140 may determine a charging speed of the battery. The processor 140 may determine a discharging speed of the battery. The processor 140 may compare the charging speed and the discharging speed.

For example, if the second supply voltage is greater than the first supply voltage, the processor 140 may identify that the charging speed is faster than the discharging speed. The change amount of supply voltage related thereto may be as shown in a graph 1800 of FIG. 18.

As another example, if the second supply voltage is equal to the first supply voltage, the processor 140 may identify that the charging speed is equal to or similar to the discharging speed. The amount of change in the supply voltage associated therewith may be as shown in a graph 1900 of FIG. 19.

According to a still another example, if the second supply voltage is smaller than the first supply voltage, the processor 140 may identify that the charging speed is less than the discharging speed. The change amount of the supply voltage related thereto may be as shown in a graph 2000 of FIG. 20.

In some embodiments, the energy harvester 120 may provide electrical energy to the power supplier 130. Therefore, the discharging speed of the supply voltage of the power supplier 130 may be delayed as much as the electric energy provided. Accordingly, the processor 140 may prevent an over-discharge of the battery by operating the energy harvester 120.

According to an embodiment, the remote controller 100 may be controlled to perform an operation corresponding to the supply voltage as in a table 705 of FIG. 7. Accordingly, the energy harvester 120 may be used to guide a user and automatically supply energy to the user so that the battery is not discharged as much as possible.

The remote controller 100, according to one embodiment, is described as operating the energy harvester 120 only when a predetermined event is identified as being generated. However, according to an embodiment, the remote controller 100 may always perform an energy harvesting operation for obtaining electrical energy from a natural energy source using the energy harvester 120.

However, when the energy harvesting operation is always performed, a problem of over-charging the battery may occur. In addition, when the energy harvester 120 is always operated, lifetime of the energy harvester 120 may be shortened. When the energy harvester 120 always operates, a problem that a reaction speed of an operation corresponding to the user input (e.g., transmission of the control signal to the external device 200) gets slower may occur. Thus, in the disclosure, the energy harvester 120 is not always operated, and instead, the energy harvester 120 may be operated only when the predetermined event is identified.

Only a simple configuration of the external device 200 has been illustrated, but in implementation, various configurations may be provided additionally. This will be described with reference to FIG. 3 below.

Figure 3:
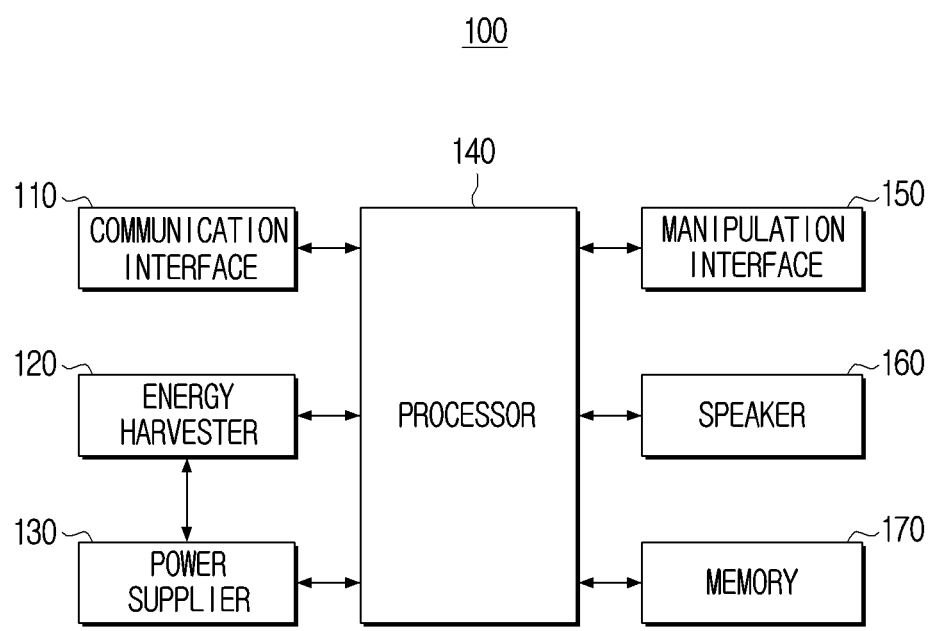
FIG. 3 is a block diagram illustrating a specific configuration of FIG. 2.

FIG. 3 is a block diagram illustrating the specific configuration of FIG. 2.

Referring to FIG. 3, the communication interface 110, the energy harvester 120, the power supplier 130, the processor 140, the manipulation interface 150, a speaker 160, and a memory 170 may be included.

The operations of the communication interface 110, the energy harvester 120, the power supplier 130, and the processor 140, which are described above will not be further described to avoid redundancy.

The manipulation interface 150 may be implemented using a device such as a button, a touch pad, a mouse, a keyboard, or a touch screen capable of performing the above-described display function and manipulation input function. Here, the button may be various types of buttons such as a mechanical button, a touch pad, a wheel, or the like, formed in an arbitrary region such as a front portion, a side portion, a back portion, or the like, of the outer surface of the main body of the remote controller 100.

The speaker 160 may be an element to output various audio data, various alarm sounds, a voice message, or the like, which are processed by the input and output interface.

The memory 170 may be implemented as an internal memory such as a read-only memory (ROM), such as electrically erasable programmable read-only memory (EEPROM), and a random-access memory (RAM) or a memory separate from the processor 140. In this case, the memory 170 may be implemented as at least one of a memory embedded within the remote controller 100 or a memory detachable from the remote controller 100 according to the usage of data storage. For example, the data for driving the remote controller 100 may be stored in the memory embedded within the remote controller 100, and the data for upscaling of the remote controller 100 may be stored in the memory detachable from the remote controller 100.

The memory embedded in the remote controller 100 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the remote controller 100, the memory may be implemented as a memory card, such as a compact flash (CF), secure digital (SD), micro secure digital (micro-SD), mini secure digital (mini-SD), extreme digital (xD), or multi-media card (MMC), and an external memory, such as a universal serial bus (USB) memory connectable to the USB port.

The remote controller 100 may additionally include various configurations in addition to the configuration of FIG. 3.

Figure 4:
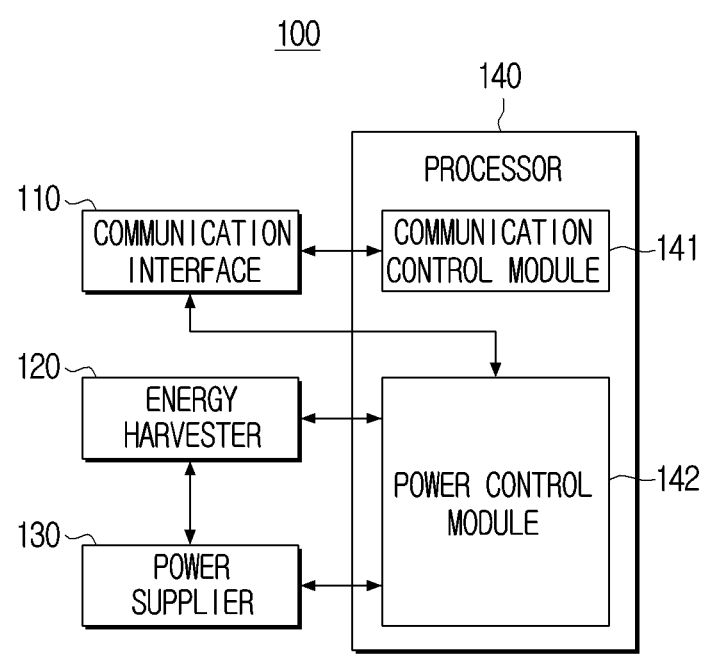
FIG. 4 is a block diagram illustrating a plurality of control modules included in a processor.

FIG. 4 is a block diagram illustrating a plurality of control modules included in a processor.

Referring to FIG. 4, the processor 140 may include a communication control module 141 and a power control module 142. The communication control module 141 and the power control module 142 may control hardware included in the remote controller 100 with different functions.

The communication control module 141 may refer to a module that controls the communication interface 110. The communication control module 141 may control the communication interface 110 to perform a communication connection with the external device 200 or transmit a control signal to the external device 200 based on user input received at the remote controller 100.

The power control module 142 may refer to a module for controlling the energy harvester 120 and the power supplier 130. Specifically, the power control module 142 may control the power supplier 130 to supply power to the remote controller 100. The power control module 142 may control the energy harvester 120 to perform an energy harvesting operation. The energy harvester 120 may generate electrical energy by performing an energy harvesting operation. According to an embodiment, the electrical energy generated by the energy harvester 120 may be directly supplied to the power supplier 130. According to another embodiment, the electrical energy generated by the energy harvester 120 may be provided to the power supplier 130 via the power control module 142.

The power control module 142 may be connected to the communication interface 110 to supply power to the communication interface 110 or cut off power. According to an embodiment, the power control module 142 may supply power to the communication interface 110 through the power supplier 130 or cut off power.

Figure 5:
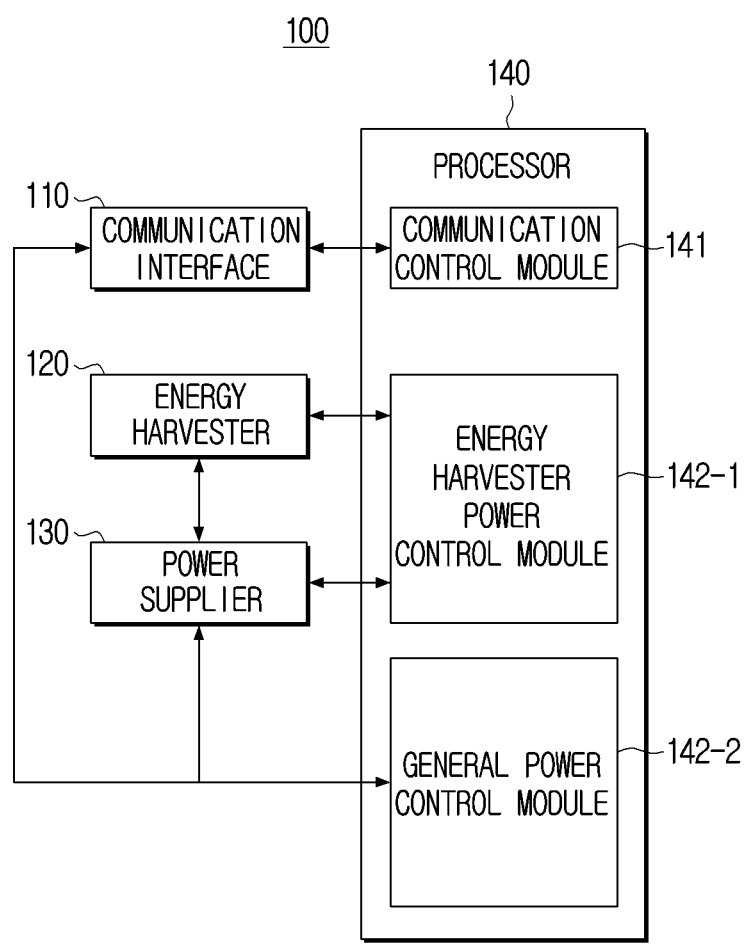
FIG. 5 is a diagram illustrating a plurality of power control modules.

FIG. 5 is a diagram illustrating a plurality of power control modules.

Referring to FIG. 5, the processor 140 may include an energy harvester power control module 142-1 and a general power control module 142-2. The energy harvester power control module 142-1 and the general power control module 142-2 may be implemented with separate hardware. For example, the energy harvester power control module 142-1 may be disposed in a first position and the general power control module 142-2 may be disposed in a second position different from the first position.

The energy harvester power control module 142-1 may control the energy harvester 120 to perform an energy harvesting operation. The energy harvester power control module 142-1 may control the energy harvester 120 to supply the electrical energy generated by the energy harvester 120 to the power supplier 130.

The general power control module 142-2 may control the power supplier 130. The general power control module 142-2 may control the power supplier 130 to supply power to a plurality of hardware configurations included in the remote controller 100. For example, the general power control module 142-2 may control the power supplier 130 to supply power to the communication interface 110.

The general power control module 142-2 may perform an operation of measuring (or identifying) charging voltage of the power supplier 130.

Figure 6:
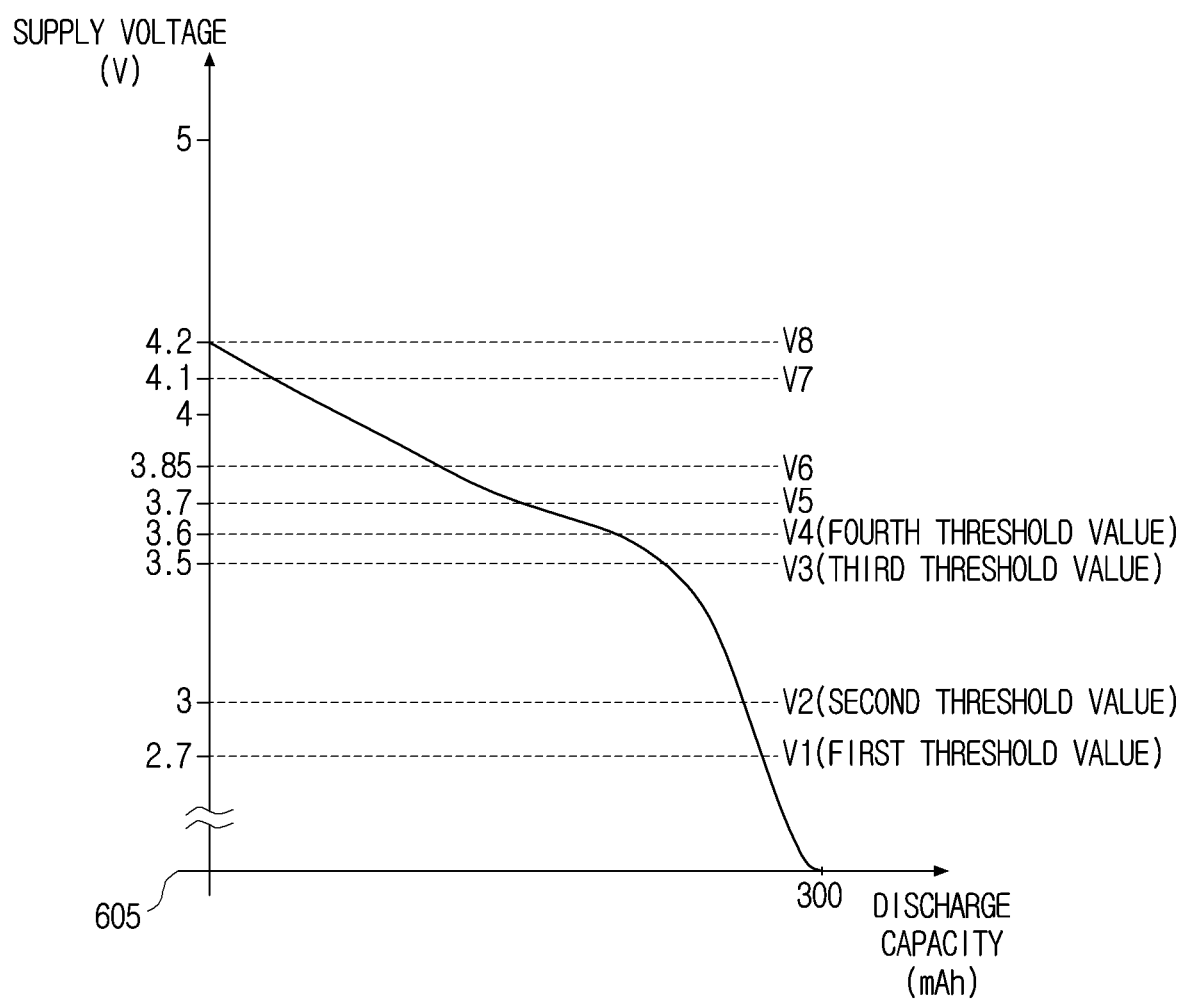
FIG. 6 is a graph illustrating a supply voltage and a discharging capacity of the power supplier.

FIG. 6 is a graph illustrating a supply voltage and a discharging capacity of the power supply.

Referring to FIG. 6, the power supplier 130 may include a battery for supplying power to the remote controller 100. The battery may refer to a storage battery for charging.

The graph 605 may denote a discharging curve included in the remote controller 100. The battery may have different supply voltages measured based on charging capacity. For example, when the battery is completely charged, the supply voltage may be measured as V8 (e.g., 4.2V).

It is assumed that the fully charged battery is discharged (no charging operation). When the supply voltage between V8 (e.g., 4.2V) and V7 (e.g., 4.1V) is identified, the remote controller 100 may identify that the battery is fully charged (e.g., the battery used from 0% up to 11%). If the supply voltage between V7 and V6 (e.g., 3.85V) is identified, the remote controller 100 may identify a third normal state (the battery used from 12% to 39%). If the supply voltage between V6 to V5 (e.g., 3.7V) is identified, the remote controller 100 may identify the second normal state (the battery is used from 40% to 67%). If the supply voltage between V4 (e.g., 3.6V) and V5 is identified, the remote controller 100 may identify the first general state (the battery is used from 68% to 89%). If the supply voltage between V3 (e.g., 3.5V) and V4 is identified, the remote controller 100 may identify the low-charging state (the battery is used from 90% to 94%). If a supply voltage between V3 and V2 (e.g., 3V) is identified, the remote controller 100 may identify the battery cutoff state (the battery is used by at least 95%). If the supply voltage between V2 and V1 (e.g., 2.7V) is identified, the remote controller 100 may identify that the sleep mode is needed. If a supply voltage of less than V1 is identified, the remote controller 100 may identify the over-discharge state.

As the identified supply voltage of the battery gets low, the discharging capacity may get larger. If the total capacity of the battery is 300 mAh, the completely discharged discharging capacity may be 300 mAh.

FIG. 7 is a diagram illustrating various power modes of a remote controller according to an embodiment.

Referring to a table 705 of FIG. 7, when a supply voltage between V8 (e.g., 4.2V) and V4 (e.g., 3.6V) is identified, the remote controller 100 may identify the battery as a normal state. The remote controller 100 may receive power based on the battery.

If the supply voltage between V4 and V3 (e.g., 3.5V) is identified, the remote controller 100 may identify the low-charging state (the battery is used from 90% up to 94%). The remote controller 100 may provide the user with information that charging is necessary. The remote controller 100 may generate a control signal for displaying a guide UI for requesting charging to the external device 200. The remote controller 100 may transmit the generated control signal to the external device 200. The external device 200 may display the guide UI based on the control signal received from the remote controller 100. The user may know that the battery of the remote controller 100 needs to be charged through the guide UI displayed on the external device 200.

If a supply voltage between V3 and V2 (e.g., 3V) is identified, the remote controller 100 may identify the battery cutoff state (the battery is used by at least 95%). When a user input is received, the remote controller 100 may provide the user with information that charging is necessary. If a user input received through the manipulation interface 150 is identified, the remote controller 100 may generate a control signal for displaying a guide UI for requesting charging to the external device 200. The remote controller 100 may transmit the generated control signal to the external device 200. The external device 200 may display the guide UI based on the control signal received from the remote controller 100.

In addition, if the supply voltage between V2 and V1 (e.g., 2.7V) is identified, the remote controller 100 may identify that a sleep mode is necessary. The remote controller 100 may release the communication connection with the external device 200 and control the energy harvester 120 to perform an energy harvesting operation.

If the supply voltage less than V1 is identified, the remote controller 100 may identify the over-discharge state. The remote controller 100 may cut off the power of the power supplier 130 using the over-discharge protection circuit.

Figure 8:
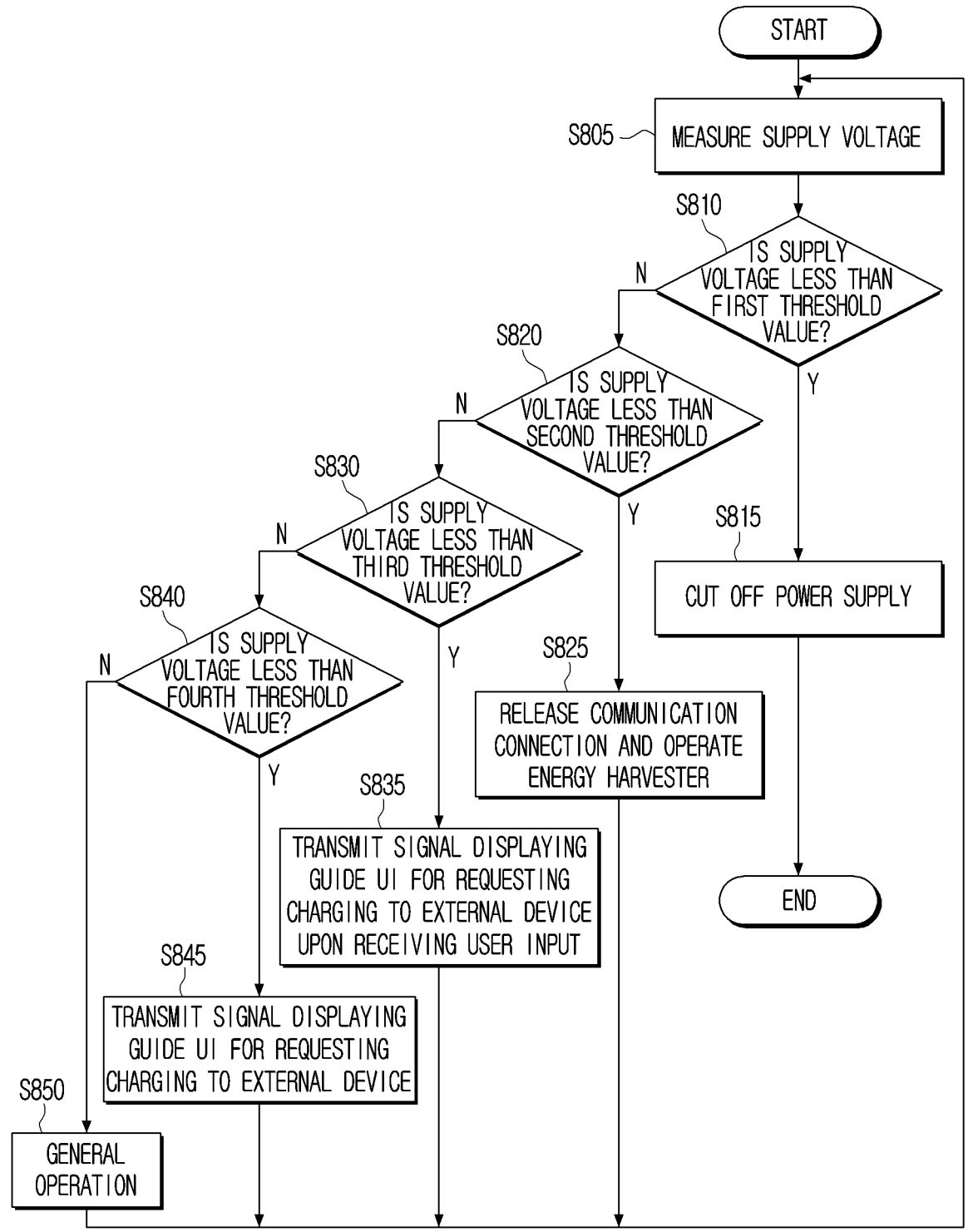
FIG. 8 is a flowchart illustrating various control operations corresponding to supply voltage.

FIG. 8 is a flowchart illustrating various control operations corresponding to supply voltage.

Referring to FIG. 8, the remote controller 100 may measure the supply voltage of the power supplier 130 in operation S805. The remote controller 100 may identify whether the measured supply voltage is less than the first threshold value in operation S810. If the measured supply voltage is less than the first threshold value in operation S810-Y, the remote controller 100 may cut off power supply of the power supplier 130 in operation S815. The remote controller 100 may repeatedly measure the supply voltage of the power supplier 130 in operation S805.

If the supply voltage is greater than or equal to the first threshold value in operation S810-N, the remote controller 100 may identify whether the supply voltage is less than the second threshold value in operation S820. If the supply voltage is less than the second threshold value in operation S820-Y, the remote controller 100 may release the communication connection with the external device 200 and operate the energy harvester 120 in operation S825.

If the supply voltage is greater than or equal to the second threshold value in operation S820-N, the remote controller 100 may identify whether the supply voltage is less than a third threshold value in operation S830. If the supply voltage is less than the third threshold value in operation S830-Y, the remote controller 100 may transmit, to the external device 200, a signal indicating the guide UI requesting charging to the external device 200 upon receiving the user input in operation S835. The remote controller 100 may display a guide UI on the external device 200 in order to provide information notifying the user of the shortage of the battery. Only when the remote controller 100 receives a user input, the remote controller 100 may generate a control signal indicating a guide UI for requesting charging to the external device 200, and transmit the generated control signal to the external device 200.

If the supply voltage is greater than or equal to the third threshold value in operation S830-N, the remote controller 100 may identify whether the supply voltage is less than the fourth threshold value in operation S840. If the supply voltage is less than the fourth threshold value in operation S840-Y, the remote controller 100 may transmit, to the external device 200, a signal indicating the guide UI requesting charging to the external device 200 in operation S845. Alternatively, in operation S845, unlike S835, a signal indicating the guide UI may be transmitted to the external device 200 regardless of whether the user input is received.

If the supply voltage is greater than or equal to a fourth threshold value in operation S840-N, the remote controller 100 may perform a general operation. The general operation may refer to an operation of remotely controlling the external device 200 based on the user input.

Figure 9:
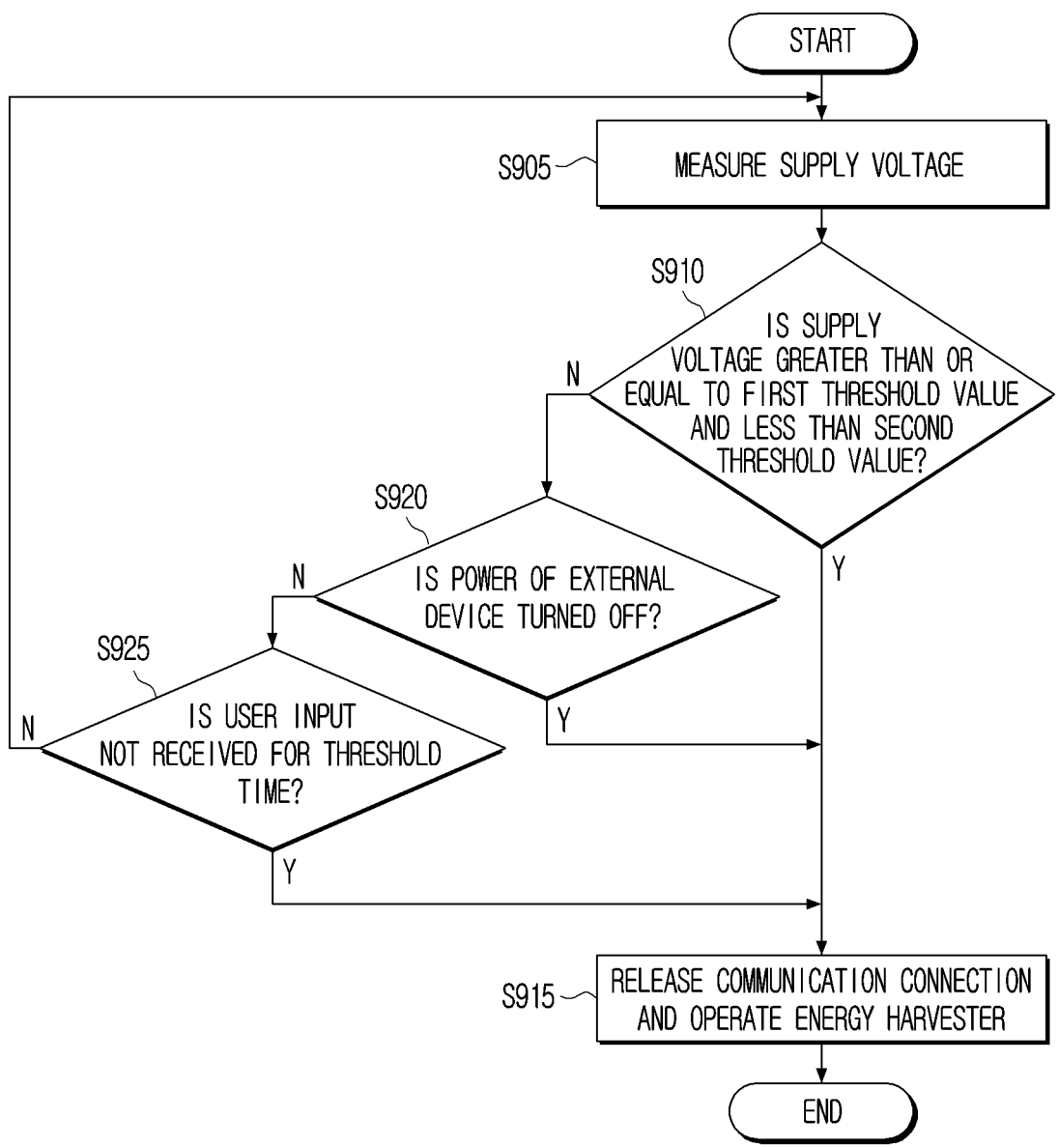
FIG. 9 is a flowchart illustrating various embodiments of changing to a sleep mode.

FIG. 9 is a flowchart illustrating various embodiments of changing to a sleep mode.

Referring to FIG. 9, the remote controller 100 may measure the supply voltage of the power supplier 130 in operation S905. The remote controller 100 may identify whether the supply voltage is greater than or equal to the first threshold value and less than the second threshold value in operation S910. If the supply voltage is greater than or equal to the first threshold value and less than the second threshold value in operation S910-Y, the remote controller 100 may release communication connection with the external device 200 and may operate the energy harvester 120 in operation S915.

If the supply voltage is greater than or equal to the second threshold value in operation S910-N, the remote controller 100 may identify whether the external device 200 is turned off in operation S920. If it is identified that the external device 200 is turned off in operation S920-Y, the remote controller 100 may release the communication connection with the external device 200 and operate the energy harvester 120 in operation S915. According to an embodiment, when a user input for turning off the power of the external device 200 is received, the remote controller 100 may identify that the power of the external device 200 is turned off. According to another embodiment, when the remote controller 100 receives a signal corresponding to power off from the external device 200, the remote controller 100 may identify that the power of the external device 200 is turned off.

If the external device is identified not to be turned off in operation S920-N, the remote controller 100 may identify whether the user input has not been received for a threshold time in operation S925. If the user input is identified as not received during the threshold time in operation S925-Y, the remote controller 100 may release the communication connection with the external device 200 and operate the energy harvester 120 in operation S915.

If the user input is identified as received during the threshold time in operation S925-N, the remote controller 100 may repeatedly measure the supply voltage in operation S905. As a result, when one of the three conditions S910, S920, and S925 is satisfied, the remote controller 100 may be changed to a sleep mode (a mode to release the communication connection with the external device 200 and operate the energy harvester 120).

Figure 10:
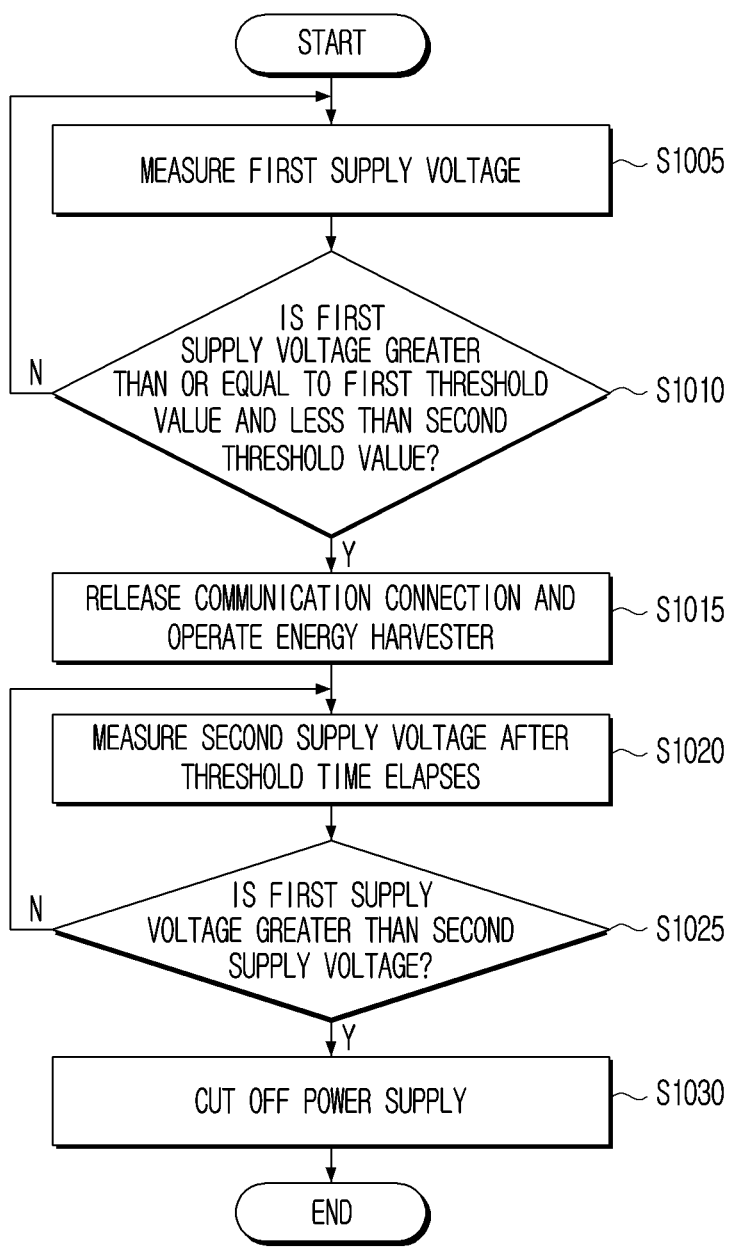
FIG. 10 is a flowchart illustrating an operation of comparing a measured voltage before a sleep mode and a measured voltage after a sleep mode.

FIG. 10 is a flowchart illustrating an operation of comparing a measured voltage before a sleep mode and a measured voltage after a sleep mode.

Referring to FIG. 10, the remote controller 100 may measure the supply voltage of the power supplier 130 in operation S1005. The supply voltage measured in S1005 is described as a first supply voltage. The remote controller 100 may identify whether the supply voltage is greater than or equal to the first threshold value and less than the second threshold value in operation S1010. If the supply voltage is greater than the second threshold value in operation S1010-N, the remote controller 100 may repeatedly measure the supply voltage in operation S1005.

If the supply voltage is greater than or equal to the first threshold value and less than the second threshold value in operation S1010-Y, the remote controller 100 may release the communication connection with the external device 200 and operate the energy harvester 120 in operation S1015. The remote controller 100 may operate the energy harvester 120 and measure the supply voltage of the power supplier 130 after a threshold time elapses in operation S1020. The supply voltage measured in operation S1020 is described as the second supply voltage.

The remote controller 100 may identify whether the first supply voltage is greater than the second supply voltage in operation S1025. If the first supply voltage is identified to be greater than the second supply voltage in operation S1025-Y, the remote controller 100 may cut off the power supply of the power supplier 130 using the over-discharge protection circuit in operation S1030. If the first supply voltage is identified as not greater than the second supply voltage in operation S1025-N, the remote controller 100 may repeatedly measure the supply voltage in operation S1020.

If the supply voltage is dropped despite the operation of the energy harvester 120 in operation S1025-Y, the remote controller 100 may identify that the discharging speed is faster than the charging speed. If the discharging speed is faster than the charging speed, the battery may proceed to an over-discharge state, and when the battery is fully discharged, the performance of the battery may be deteriorated. The remote controller 100 may compare the supply voltage after operating the energy harvester 120 and the supply voltage before operating the energy harvester 120 to determine whether to use the over-discharge protection circuit.

Figure 11:
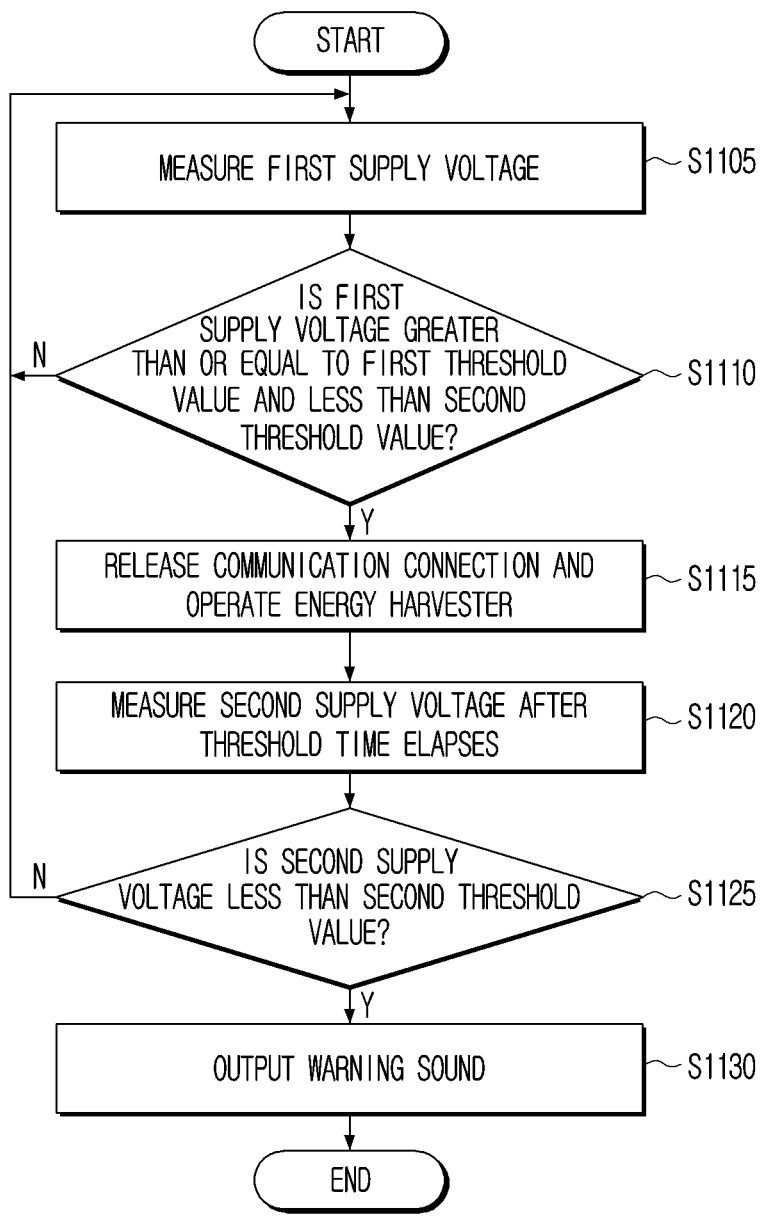
FIG. 11 is a flowchart illustrating an operation of outputting an alarm sound.

FIG. 11 is a flowchart illustrating an operation of outputting an alarm sound.

Referring to FIG. 11, operations S1105, S1110, S1115, and S1120 may correspond to S1005, S1010, S1015, and S1020 of FIG. 10. Therefore, redundant description will be omitted.

The remote controller 100 may identify whether the second supply voltage measured in operation S1120 is less than the second threshold value in operation S1125. If the second supply voltage is less than the second threshold value in operation S1125-Y, the remote controller 100 may output a warning alarm sound in operation S1130. If the supply voltage has been lowered despite operating the energy harvester 120, the remote controller 100 may identify that the battery may be over-discharged. Accordingly, the remote controller 100 may output a predetermined warning alarm sound through the speaker 160 of the remote controller 100 to alert the user. The predetermined warning alarm sound may be audio data or a beep sound having a predetermined melody.

Figure 12:
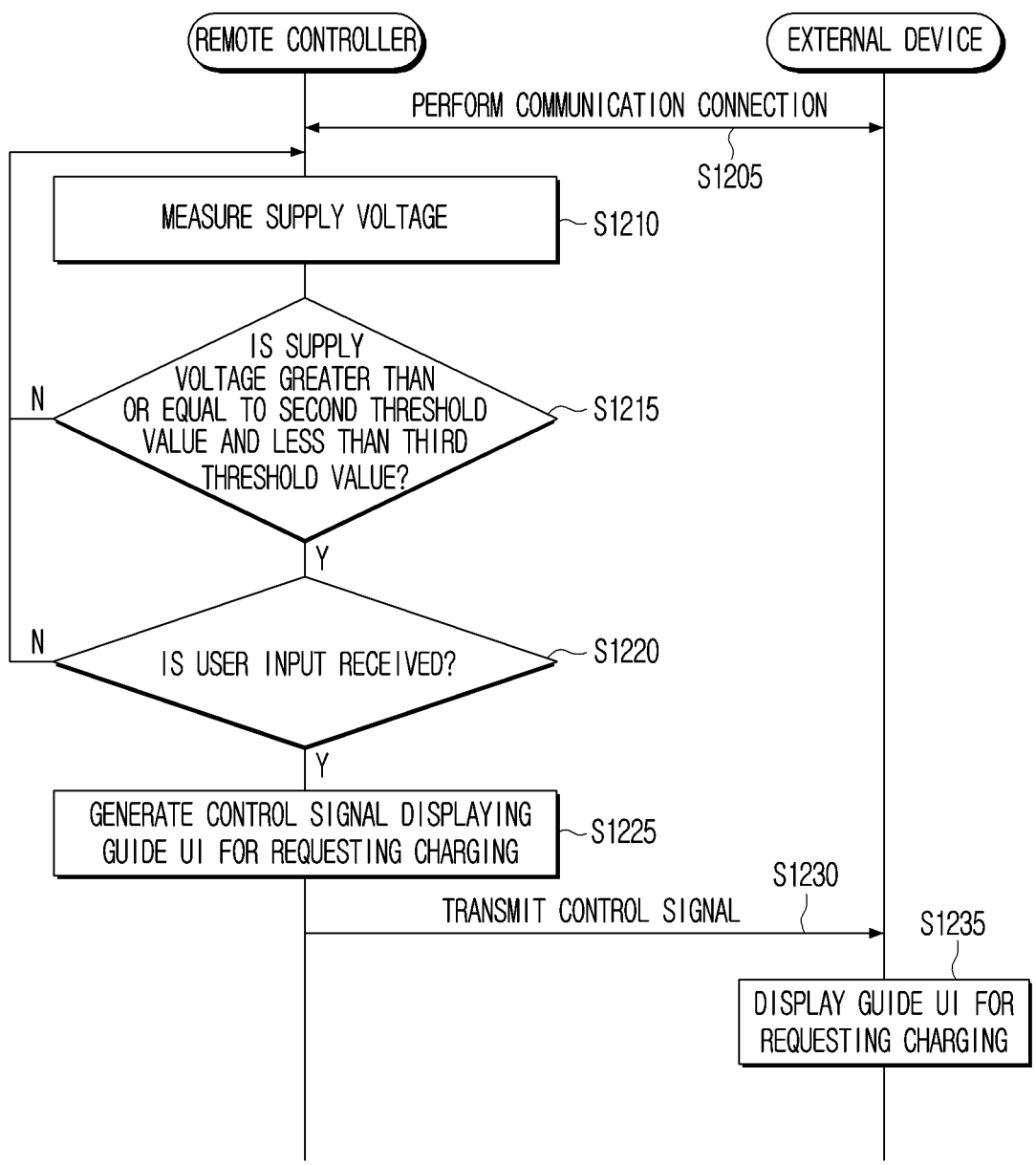
FIG. 12 is a flowchart illustrating an operation of displaying a guide user interface (UI) for request of charging according to an embodiment.

FIG. 12 is a flowchart illustrating an operation of displaying a guide user interface (UI) for request of charging according to an embodiment.

Referring to FIG. 12, the remote controller 100 may perform a communication connection with the external device 200 in operation S1205. The remote controller 100 may measure the supply voltage of the power supplier 130 in operation S1210. The remote controller 100 may identify whether the supply voltage is greater than or equal to the second threshold value and less than the third threshold value in operation S1215. If the supply voltage is not greater than or equal to the second threshold value and less than the third threshold value in operation S1215-N, the remote controller 100 may repeatedly measure the supply voltage in operation S1210.

If the supply voltage is greater than or equal to the second threshold value and less than the third threshold value in operation S1215-Y, the remote controller 100 may identify whether the user input is received in operation S1220. The user input may mean a user input for controlling the external device 200. If the user input is not received in operation S1220-N, the remote controller 100 may repeatedly measure the supply voltage in operation S1210.

If a user input is received in operation S1220-Y, the remote controller 100 may generate a control signal for displaying the charging request guide UI in operation S1225. The remote controller 100 may transmit the generated control signal to the external device 200 in operation S1230. The external device 200 may display the charging request guide UI on the display of the external device 200 based on the control signal received from the remote controller 100 in operation S1235. The charging request guide UI may include information for guiding the charging of the remote controller 100.

Figure 13:
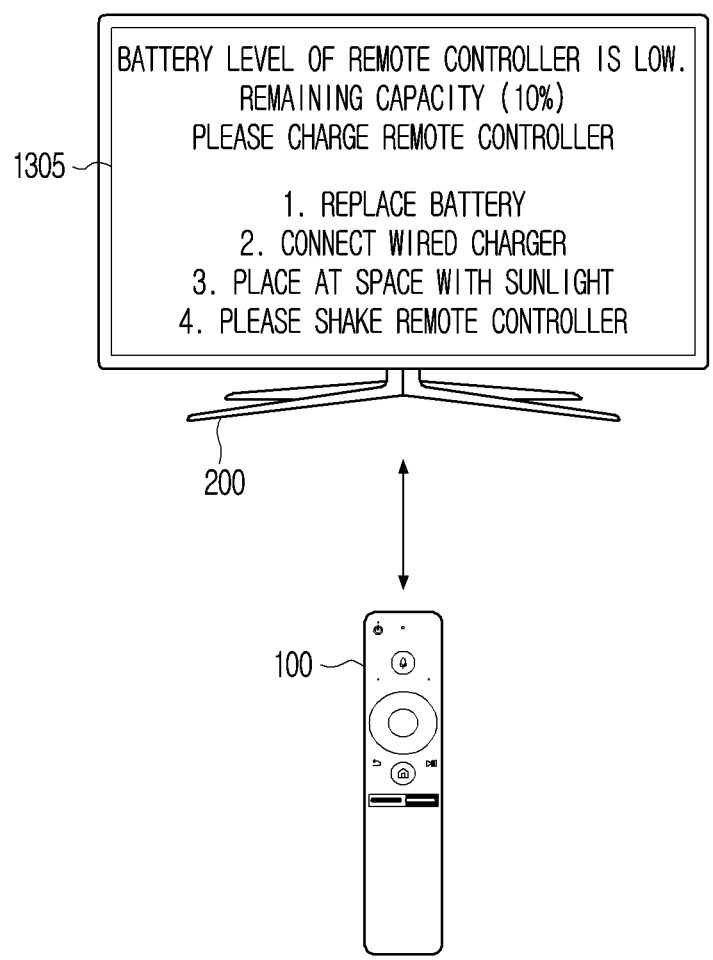
FIG. 13 is a diagram illustrating an operation of displaying a guide UI for request charging displayed on an external device.

FIG. 13 is a diagram illustrating an operation of displaying a guide UI for request charging displayed on an external device.

Referring to FIG. 13, the external device 200 may receive a control signal related to the guide UI from the remote controller 100. The guide UI 1305 may include at least one of power state information, residual capacity information, charging request text, guide operation information, or the like, of the remote controller 100.

The power state information may include text that the power state of the battery is low. The residual capacity information may mean the residual capacity that may be supplied by the remote controller 100. The charging request text may refer to a text indicating that charging is needed for a user such as "please charge a remote controller." The guide operation information may include an operation of guiding various charging methods of the remote controller 100. Various charging methods may mean battery replacement, wired charger connection, and energy harvesting operation.

The energy harvesting operation according to an embodiment may be an operation using solar heat. The energy harvester 120 may generate electrical energy based on solar heat. The guide operation information corresponding to the energy harvesting operation using solar energy may be "place at a space with sunlight".

The energy harvesting operation according to another embodiment may be an operation using vibration energy. Here, the vibration energy may mean an energy generated by vibration of the energy harvester 120. If the user shakes the remote controller 100, the energy harvester 120 may generate electrical energy based on the vibration energy. Here, the guide operation information corresponding to the energy harvesting operation using the vibration energy may be "please shake the remote controller".

Figure 14:
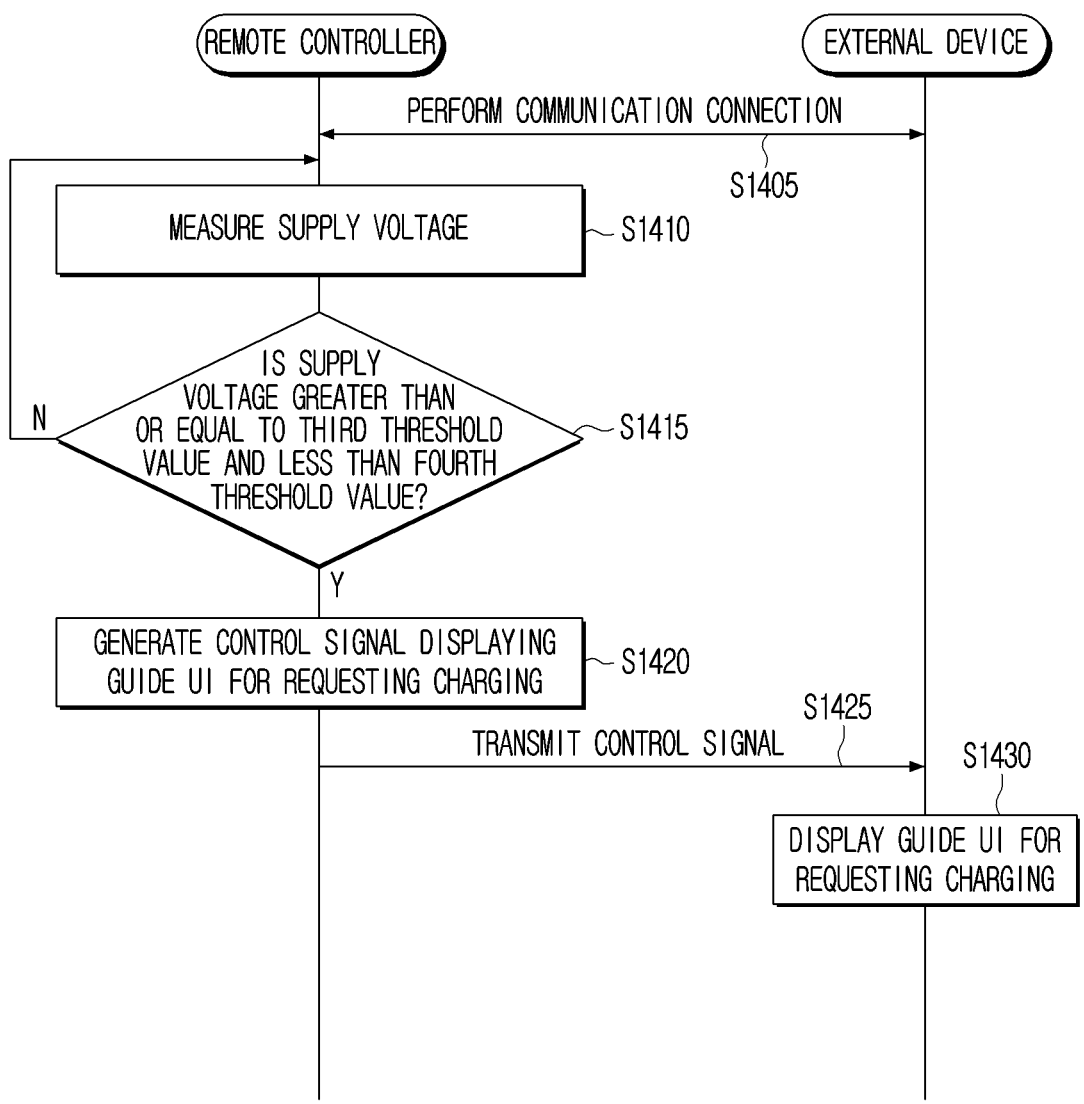
FIG. 14 is a flowchart illustrating an operation of displaying a guide UI for request charging according to another embodiment.

FIG. 14 is a flowchart illustrating an operation of displaying a guide UI for request charging according to another embodiment.

Referring to FIG. 14, the remote controller 100 may perform a communication connection with the external device 200 in operation S1405. The remote controller 100 may measure the supply voltage of the power supplier 130 in operation S1410. The remote controller 100 may identify whether the supply voltage is greater than or equal to a third threshold and less than a fourth threshold in operation S1415.

If the supply voltage is not greater than or equal to the third threshold and less than the fourth threshold in operation S1415-N, the remote controller 100 may repeatedly measure the supply voltage in operation S1410. If the supply voltage is greater than or equal to the third threshold value and less than the fourth threshold value in operation S1415-Y, the remote controller 100 may generate a control signal for displaying the charging request guide UI on the external device 200 in operation S1420. The remote controller 100 may transmit the generated control signal to the external device 200 in operation S1425. The external device 200 may display the charging request guide UI on the display of the external device 200 based on the control signal received from the remote controller 100 in operation S1430.

Figure 15:
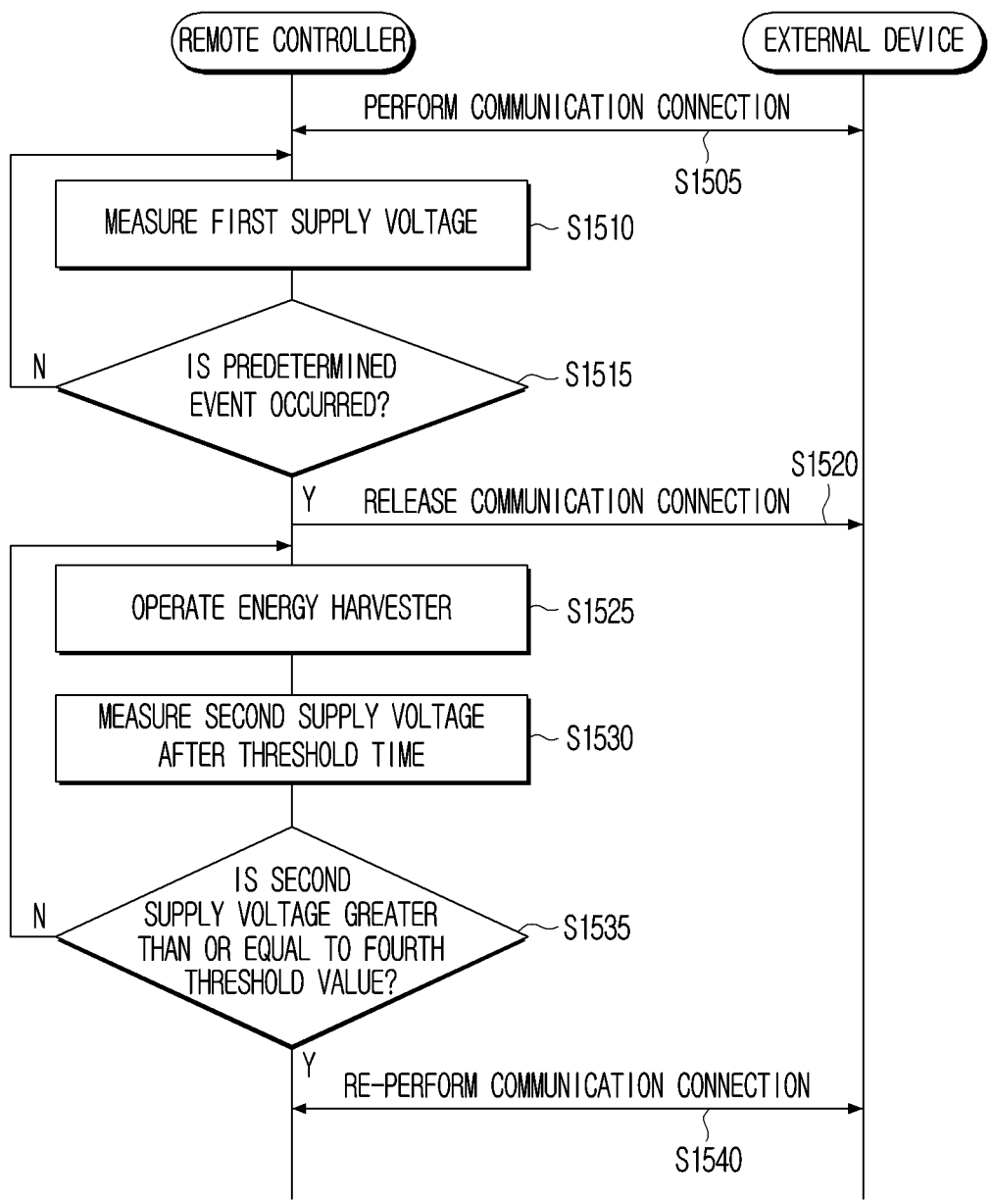
FIG. 15 is a flowchart illustrating an operation of releasing a sleep mode and re-performing communication connection with an external device again.

FIG. 15 is a flowchart illustrating an operation of releasing a sleep mode and re-performing (or re-establishing) communication connection with an external device again.

Referring to FIG. 15, the remote controller 100 may perform communication connection with the external device 200 in operation S1505. The remote controller 100 may measure the supply voltage of the power supplier 130. The supply voltage measured in operation S1510 will be described as the first supply voltage.

The remote controller 100 may identify whether a predetermined event has occurred in operation S1515. The predetermined event may include an event in which the supply voltage is greater than or equal to the first threshold value and less than the second threshold, an event in which the power of the external device 200 is identified to be turned off, and an event in which a user input is not received during threshold time. If it is identified that a predetermined event has not occurred in operation S1515-N, the remote controller 100 may repeatedly measure the supply voltage in operation S1510.

If the remote controller 100 identifies that one of the plurality of predetermined events has occurred in operation S1515-Y, the remote controller 100 may release the communication connection with the external device 200 in operation S1520. The remote controller 100 may operate the energy harvester 120 in operation S1525.

When a threshold time elapses after the energy harvester 120 is operated, the remote controller 100 may measure the second supply voltage in operation S1530. The supply voltage measured in operation S1530 will be described as second supply voltage.

The remote controller 100 may identify whether the second supply voltage is greater than or equal to a fourth threshold value in operation S1535. If the second supply voltage is less than the fourth threshold in operation S1535-N, the remote controller 100 may repeatedly perform S1525, S1530, and S1535.

When the second supply voltage is greater than or equal to the fourth threshold in operation S1535-Y, the remote controller 100 may re-perform communication connection with the external device 200 in operation S1540.

One of the criteria for releasing the communication connection by the remote controller 100 with the external device 200 is when the supply voltage is less than the second threshold. Thus, when the supply voltage is identified greater than or equal to the second threshold, the remote controller 100 may maintain communication connection with the external device 200. However, after the communication connection with the external device 200 is released, even if the supply voltage is identified again equal to or greater than the second threshold value, communication connection with the external electronic device 200 may not be re-performed. The supply voltage being higher than or equal to the second threshold value may not mean that the battery has been fully charged. In Table 705 of FIG. 7, it is possible to evaluate that the charging capacity of the battery is somewhat lower up to V4 corresponding to the fourth threshold value even if the capacity is V2 or higher corresponding to the second threshold value. If the supply voltage is identified equal to or higher than V4 corresponding to the fourth threshold, the remote controller 100 may re-perform the communication connection with the external device 200. If the supply voltage is identified to be equal to or greater than the fourth threshold, the remote controller 100 may evaluate the charging of the battery to a stable state.

Figure 16:
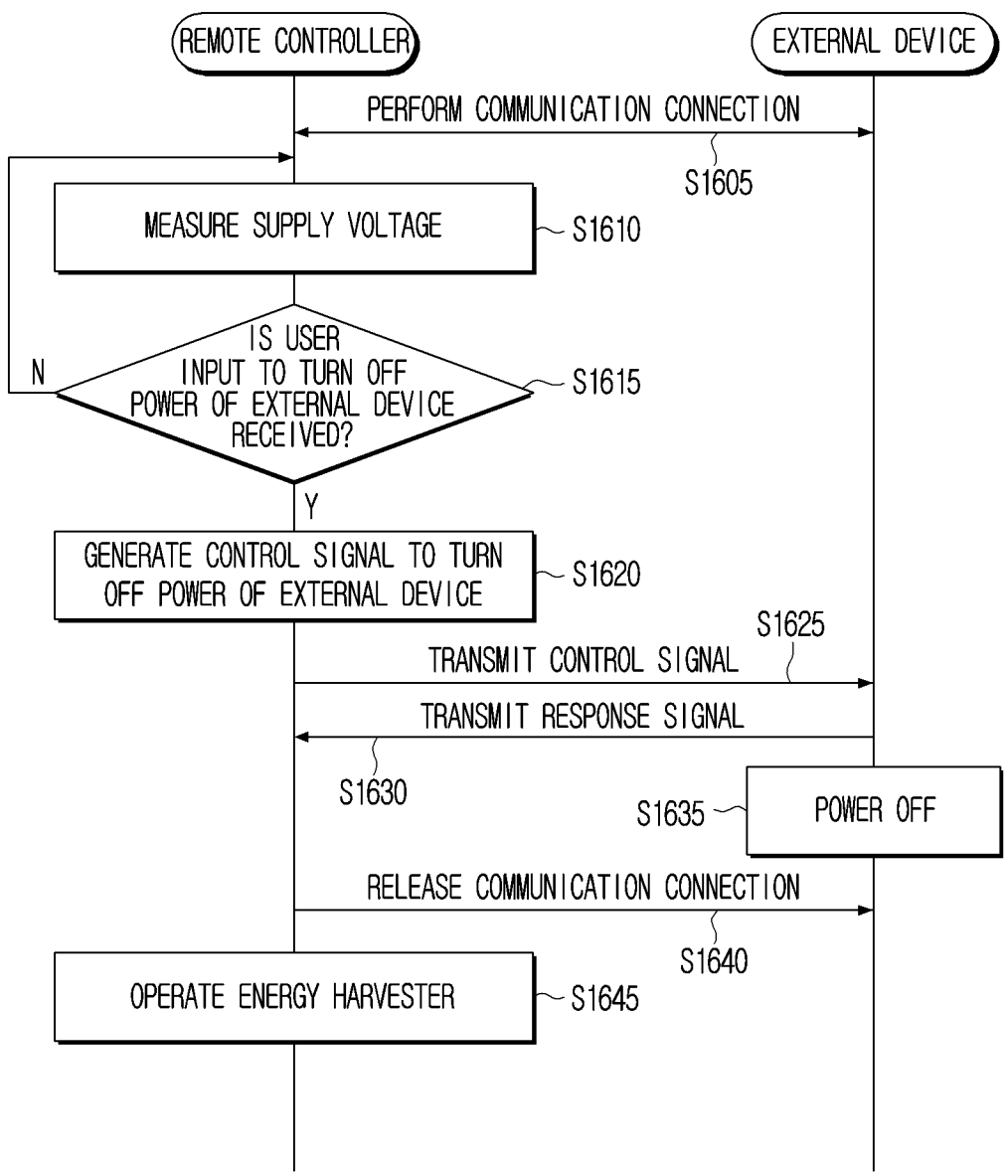
FIG. 16 is a flowchart illustrating an operation of the remote controller when a user input to turn off an external device is received.

FIG. 16 is a flowchart illustrating an operation of the remote controller when a user input to turn off an external device is received.

Referring to FIG. 16, the remote controller 100 may perform a communication connection with the external device 200 in operation S1605. The remote controller 100 may measure the supply voltage of the power supplier 130 in operation S1610. The remote controller 100 may identify whether a user input for turning off the power of the external device 200 has been received in operation S1615. If a user input for turning off the power of the external device 200 is not received in operation S1615-N, the remote controller 100 may repeatedly measure the supply voltage in operation S1610.

If a user input for turning off the power of the external device 200 is received in operation S1615-Y, the remote controller 100 may generate a control signal for turning off the power of the external device 200 based on the user input in operation S1620. The remote controller 100 may transmit the generated control signal to the external device 200 in operation S1625.

When the external device 200 receives a control signal from the remote controller 100, the external device 200 may transmit a response signal to the remote controller 100. The external device 200 may turn off the power on the basis of the control signal received from the remote controller 100 in operation S1635.

When the remote controller 100 receives a response signal from the external device 200, the remote controller 100 may release the communication connection with the external device 200 in operation S1640. The remote controller 100 may operate the energy harvester 120 in operation S1645.

Figure 17:
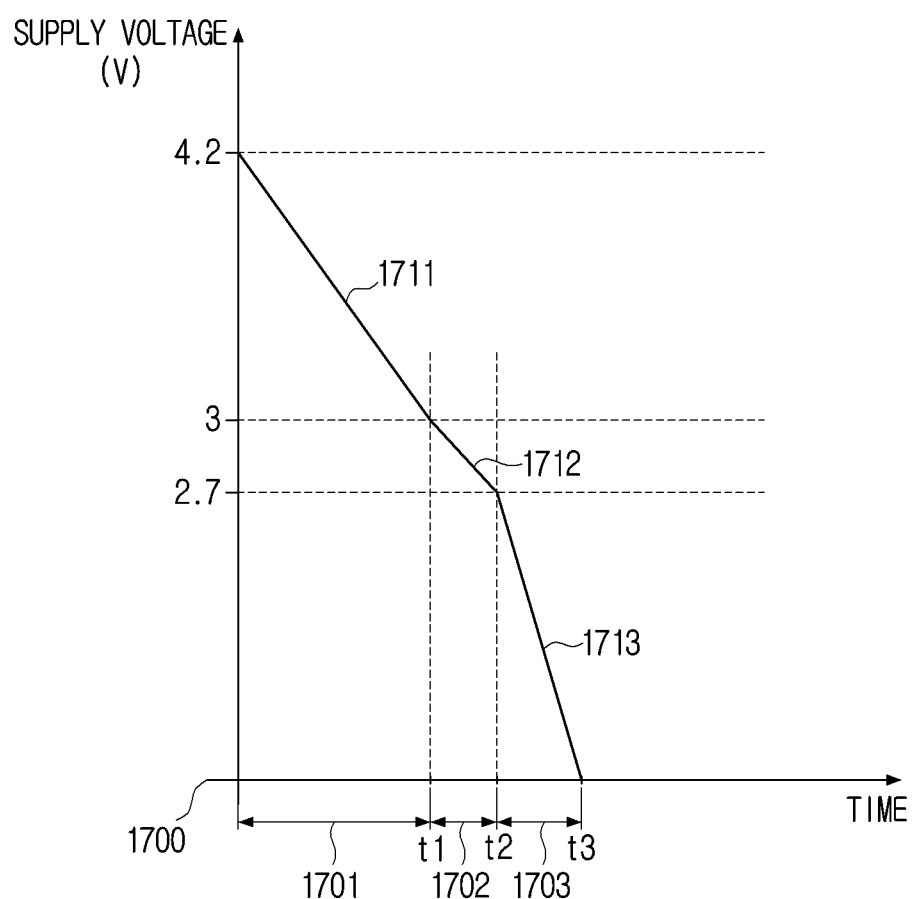
FIG. 17 is a graph illustrating a change in supply voltage over time according to an embodiment.

FIG. 17 is a graph illustrating a change in supply voltage over time according to an embodiment.

Referring to the graph 1700 of FIG. 17, a general battery discharging process will be described. The graph 1700 may be divided into a time interval 1701 from 0 to t1, a time interval 1702 from t1 to t2, and a time interval 1703 from t2 to t3.

The supply voltage at time interval 1701 may be reduced from 4.2 V to 3V. The remote controller 100 may perform an operation corresponding to a supply voltage. This related content is described in FIGS. 6 and 7.

The supply voltage at time interval 1702 may be reduced from 3V to 2.7V. If the supply voltage is identified below 3V, the remote controller 100 may turn off all the main functions other than the function identifying the supply voltage. For example, the remote controller 100 may release the communication connection with the external device 200. Since the discharging speed in the time interval 1702 operates in a power saving mode, the discharging speed of the time interval 1701 may be less than the discharging speed of the time interval 1701. An absolute value of a slope of a supply voltage curve 1712 corresponding to the time interval 1702 may be smaller than the absolute value of the slope of the supply voltage curve 1711 corresponding to the time period 1701.

The supply voltage at time interval 1703 may be less than 2.7V. If the supply voltage is identified to be equal to or less than 2.7V, the supply voltage of the battery may be rapidly reduced. The absolute value of the slope of the supply voltage curve 1713 corresponding to the time interval 1703 may be greater than the absolute value of the slope of the supply voltage curve 1712 corresponding to the time period 1702.

Figure 18:
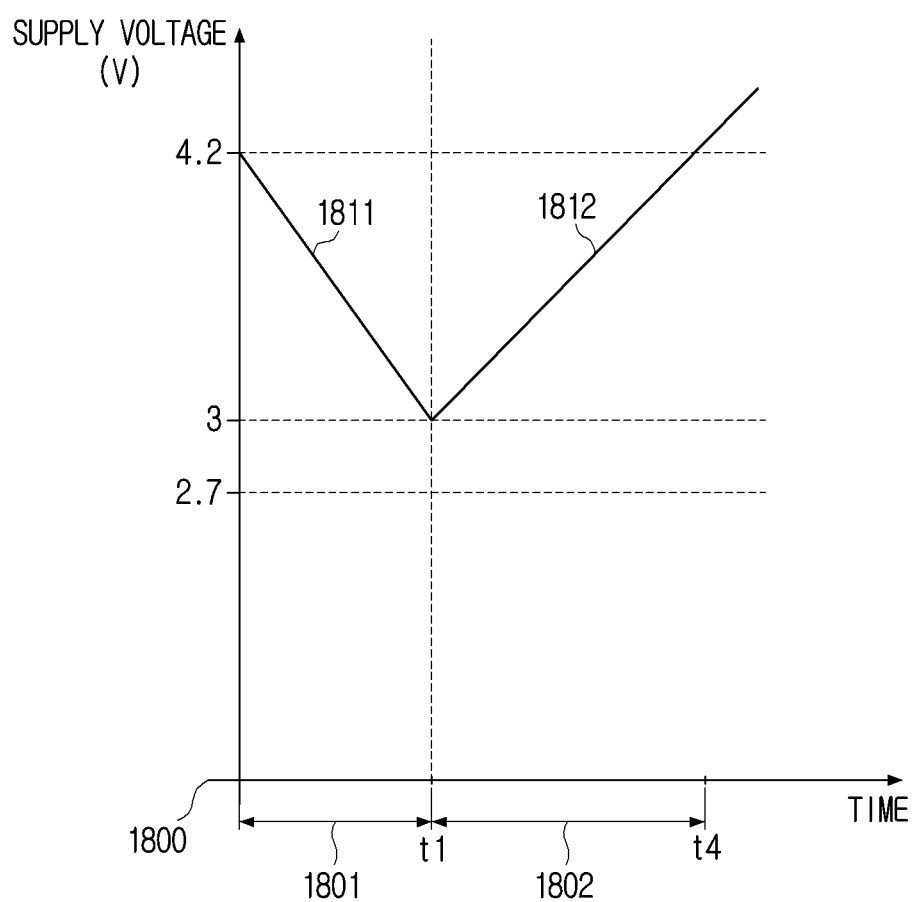
FIG. 18 is a graph illustrating a change in supply voltage over time according to another embodiment.

FIG. 18 is a graph illustrating a change in supply voltage over time according to another embodiment.

Referring to a graph 1800 of FIG. 18, the process of charging a battery by operating the energy harvester 120 according to an embodiment will be described. The graph 1800 may be divided into a time interval 1801 from 0 to t1 and a time interval 1802 from t1 to t4.

The supply voltage at time interval 1801 may be reduced from 4.2 V to 3V. The remote controller 100 may perform an operation corresponding to a supply voltage. This related content is described with reference to FIGS. 6 and 7. A supply voltage curve 1811 at the time interval 1801 may correspond to the supply voltage curve 1711 in the time period 1701 of FIG. 17.

The supply voltage at time interval 1802 may be less than 3V. Once the supply voltage is identified below 3V, the remote controller 100 may operate the energy harvester 120. The power supplier 130 may obtain electrical energy generated by the energy harvester 120. Accordingly, the supply voltage of the power supplier 130 may be increased by the energy harvester 120.

The charging speed of the battery charged based on the electrical energy generated by the energy harvester 120 may be faster than the discharging speed. Thus, the supply voltage may continue to rise. If the slope of the supply voltage curve 1811 corresponding to the time interval 1801 is negative, the slope of the supply voltage curve 1812 corresponding to the time interval 1802 may be positive.

A role of the energy harvester 120 is to charge a battery in addition to preventing over-discharge of the battery.

Figure 19:
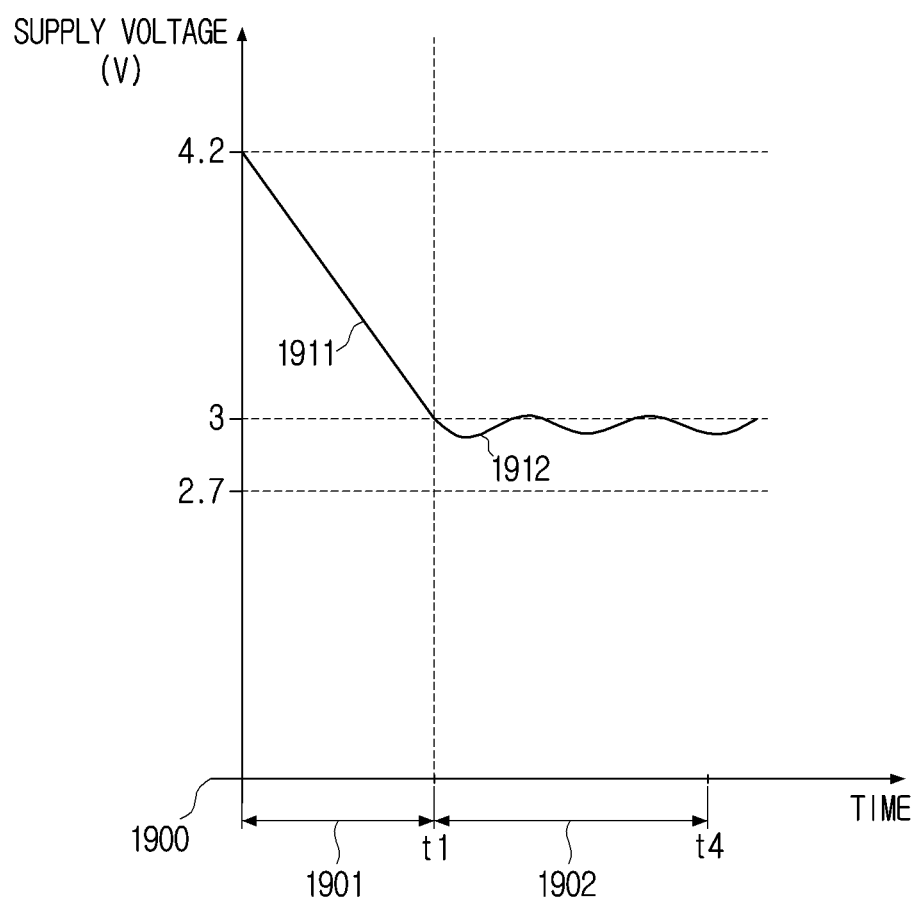
FIG. 19 is a graph illustrating a change in supply voltage over time according to another embodiment.

FIG. 19 is a graph illustrating a change in supply voltage over time according to another embodiment.

Referring to a graph 1900 of FIG. 19. A process of charging a battery by operating the energy harvester 120 according to an embodiment will be described. The graph 1900 may be divided into a time interval 1901 from 0 to t1 and a time interval 1902 from t1 to t4.

The supply voltage at time interval 1901 may be reduced from 4.2 V to 3V. The remote controller 100 may perform an operation corresponding to a supply voltage. The related content is described in FIGS. 6 and 7. A supply voltage curve 1911 at a time interval 1901 may correspond to the supply voltage curve 1711 in the time interval 1701 of FIG. 17.

The supply voltage at a time interval 1902 may be less than 3V. If the supply voltage is identified below 3V, the remote controller 100 may operate the energy harvester 120. The power supplier 130 may obtain electrical energy generated by the energy harvester 120. The supply voltage of the power supplier 130 may be increased by the energy harvester 120.

The charging speed of the battery charged based on the electrical energy generated by the energy harvester 120 may be similar to the discharging speed. Even if the energy harvester 120 operates, the supply voltage may not continue to rise. The supply voltage curve 1912 corresponding to the time interval 1902 may be maintained around 3V.

The role of the energy harvester 120 is to prevent over-discharge of the remote controller 100, not to fully charge the remote controller 100.

Figure 20:
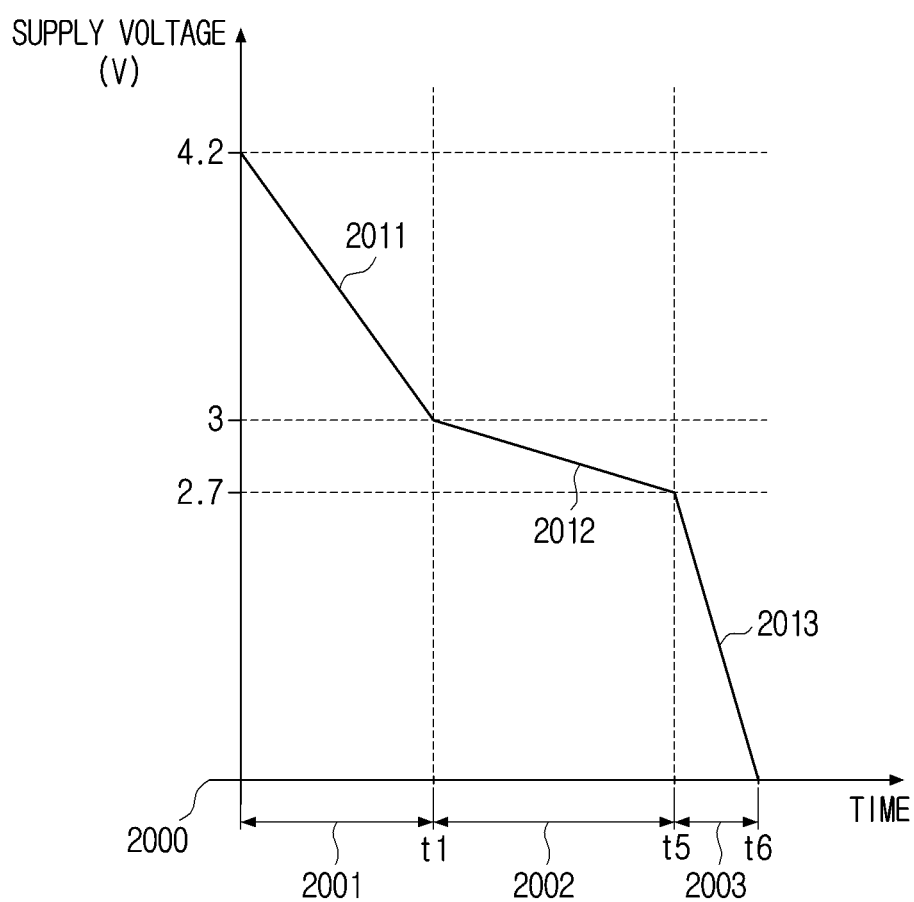
FIG. 20 is a graph illustrating a change in supply voltage over time according to still another embodiment.

FIG. 20 is a graph illustrating a change in supply voltage over time according to still another embodiment.

With reference to a graph 2000 of FIG. 20, a general battery discharge process will be described. A graph 2000 may be divided into a time interval 2001 from 0 to t1, a time interval 2002 from t1 to t5, and a time interval 2003 from t5 to t6.

The supply voltage at a time interval 2001 may be reduced from 4.2 V to 3V. The remote controller 100 may perform an operation corresponding to a supply voltage. The related content is described with reference to FIGS. 6 and 7. The supply voltage curve 2011 in the time interval 2001 may correspond to the supply voltage curve 1711 in the time interval 1701 of FIG. 17.

The supply voltage at time interval 2002 may be less than 3V. Once the supply voltage is identified below 3V, the remote controller 100 may operate the energy harvester 120. The power supplier 130 may obtain electrical energy generated by the energy harvester 120. Accordingly, the supply voltage of the power supplier 130 may be increased by the energy harvester 120.

The charging speed of the battery charged based on the electrical energy generated by the energy harvester 120 may be slower than the discharging speed. Thus, the supply voltage may continue to fall. Since a small amount of the electric energy is obtained by the energy harvester 120, the absolute value of the slope of the supply voltage curve 2012 corresponding to the time interval 2002 may be smaller than the absolute value of the slope of the supply voltage curve 2011 corresponding to the time interval 2001.

The supply voltage at time interval 2003 may get small to be less than 2.7V. If the supply voltage is identified to be equal to or less than 2.7V, the supply voltage of the battery may be rapidly reduced. The absolute value of the slope of the supply voltage curve 2013 corresponding to the time interval 2003 may be greater than the absolute value of the slope of the supply voltage curve 2012 corresponding to the time interval 2002.

A graph 2000 of FIG. 20 may be similar to the graph 1700 of FIG. 17 in part. However, the embodiment of FIG. 20 may additionally operate the energy harvester 120. In the embodiment of FIG. 20, the falling rate of the supply voltage may be smaller as the energy harvester 120 operates. Specifically, the time interval 2002 of FIG. 20 may be greater than the time period 1702 of FIG. 17. As a result, the remote controller 100 may lower the falling speed of the supply voltage by the energy harvester 120.

A role of the energy harvester 120 is to postpone a time to reach over-discharge of the remote controller 100 as late as possible.

Figure 21:
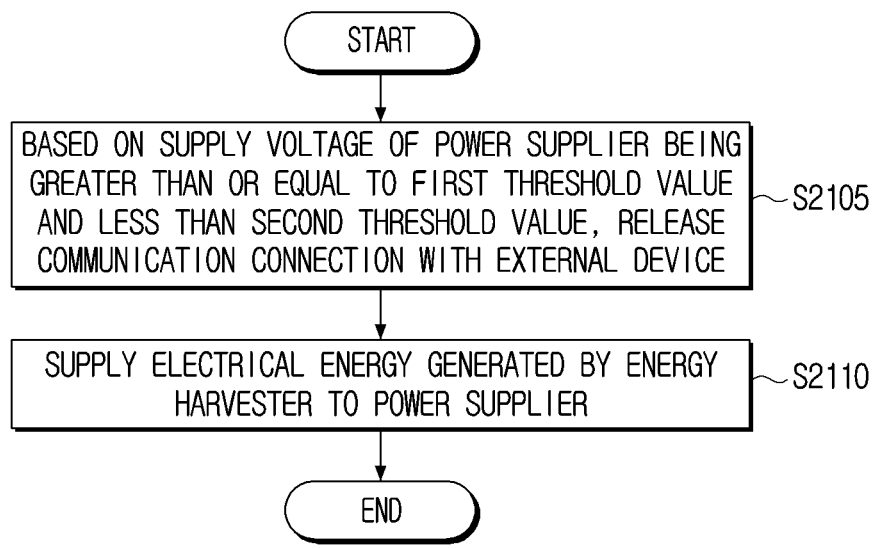
FIG. 21 is a flowchart illustrating a controlling method of a remote controller according to an embodiment.

FIG. 21 is a flowchart illustrating a controlling method of a remote controller according to an embodiment.

Referring to FIG. 21, the controlling method of the remote controller 100 to transmit a signal to the external device 200 may include, based on a supply voltage of the power supplier 130 included in the remote controller 100 being greater than or equal to a first threshold value and less than a second threshold value, releasing communication connection with the external device 200 in operation S2105 and supplying an electrical energy generated by the energy harvester 120 included in the remote controller 100 to the power supplier 130 in operation S2110.

The controlling method may further include, based on a supply voltage of the power supplier 130, after the communication connection is released, being less than the first threshold value, controlling an over-discharge protection circuit included in the power supplier 130 to cut off power supply of the power supplier 130.

The controlling method may further include, based on the supply voltage being greater than or equal to the second threshold value and less than a third threshold value, transmitting, to the external device 200, a signal to display a guide user interface (UI) requesting charging on a display of the external device 200 based on a user input received through a manipulation interface included in the remote controller 100.

The controlling method may include, based on the supply voltage being greater than or equal to the third threshold value and less than a fourth threshold value, transmitting, to the external device 200, a signal to display a guide UI requesting charging on the display of the external device 200.

The controlling method may further include, based on a supply voltage of the power supplier 130, after the communication connection is released, being greater than or equal to a fourth threshold value, re-performing communication connection with the external device 200.

The controlling method may further include, based on a user input not being received through the manipulation interface included in the more controller 100 during a threshold time, releasing communication connection with the external device 200 and supplying an electrical energy generated by the energy harvester 120 to the power supplier 130.

The method may further include, based on the external device 200 being identified to be powered off (or based on the external device 200 being power off), releasing communication connection with the external device 200 and providing the electrical energy generated by the energy harvester 120 to the power supplier 130.

The control method may further include generating a signal to turn off power of the external device 200 based on a user input received through the manipulation interface included in the remote controller 100, and transmitting the generated signal to the external device 200, and after transmitting the generated signal to the external device 200, releasing communication connection with the external device 200 and supplying the electrical energy generated by the energy harvester 120 to the power supplier 130.

The remote controller 100 may include a communication control module and a power control module, and the communication control module may transmit a signal corresponding to a user input to the external device 200, and the power control module may control the electrical energy generated by the energy harvester 120 to the power supplier 130.

The method may further include, based on a first supply voltage of the power supplier 130 obtained at a point in time before the electrical energy generated by the energy harvester 120 is supplied to the power supplier 130 being greater than a second supply voltage of the power supplier 130 obtained after a threshold time from a point in time when the electrical energy generated by the energy harvester 120 is supplied to the power supplier 130, control the over-discharge protection circuit included in the power supplier 130 to cut off power supply of the power supplier 130.

The control method of the remote controller 100 as illustrated in FIG. 21 may be executed by the remote controller 100 having the configurations of FIGS. 2 to 5, and may be executed by the remote controller 100 having other configurations as well.

The methods according to the various embodiments as described above may be implemented as an application format installable in a related-art remote controller.

The methods according to the various embodiments as described above may be implemented as software upgrade or hardware upgrade for a related-art remote controller.

The various embodiments described above may be performed through an embedded server provided in a remote controller (or electronic device), or an external server of at least one remote controller (or electronic device) and a display device.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. A remote controller to control an external device, the remote controller comprising:
a communication interface to communicate with the external device;
an energy harvester to obtain an electrical energy;
a power supplier to receive supply of the electrical energy from the energy harvester; and
a processor configured to:
based on a supply voltage of the power supplier being greater than or equal to a first threshold value and less than a second threshold value, control the communication interface to release a current communication connection established to communicate with the external device, and supply the electrical energy obtained by the energy harvester to the power supplier,
wherein the release of the current communication connection includes a disconnection of a communication session established between the remote controller and the external device.

2. The remote controller of claim 1, wherein the power supplier includes an over-discharge protection circuit, and wherein the processor is further configured to:
based on a supply voltage of the power supplier, after the communication connection is released, being less than the first threshold value, control the over-discharge protection circuit to cut off power supply of the power supplier.

3. The remote controller of claim 1, further comprising:
a manipulation interface to receive a user input,
wherein the processor is further configured to:
based on the supply voltage of the power supplier being greater than or equal to the second threshold value and less than a third threshold value, transmit, to the external device through the communication interface, a signal to display a guide user interface (UI) in relation to charging of the power supplier of the remote controller on a display of the external device provided the user input is received through the manipulation interface.

4. The remote controller of claim 3, wherein the processor is further configured to:
based on the supply voltage of the power supplier being greater than or equal to the third threshold value and less than a fourth threshold value, transmit, to the external device through the communication interface, a signal to display a guide UI in relation to charging of the power supplier of the remote controller on the display of the external device.

5. The remote controller of claim 1, wherein the processor is further configured to:
based on the supply voltage of the power supplier, after the communication connection is released, being greater than or equal to a fourth threshold value, control the communication interface to re-establish the communication connection with the external device.

6. The remote controller of claim 1, further comprising:
a manipulation interface to receive a user input,
wherein the processor is further configured to:
based on the user input not being received through the manipulation interface during a threshold time, control the communication interface to release the communication connection with the external device and supply the electrical energy obtained by the energy harvester to the power supplier.

7. The remote controller of claim 1, wherein the processor is further configured to
based on the external device being identified to be powered off, control the communication interface to release the communication connection with the external device and supply the electrical energy obtained by the energy harvester to the power supplier.

8. The remote controller of claim 7, further comprising:
a manipulation interface to receive a user input,
wherein the processor is further configured to:
generate a signal to turn off power of the external device based on the user input received through the manipulation interface, and transmit the generated signal to the external device through the communication interface, and
after transmitting the generated signal to the external device, control the communication interface to release the communication connection with the external device and supply the electrical energy obtained by the energy harvester to the power supplier.

9. The remote controller of claim 1, wherein the processor comprises:
a communication control module which transmits a signal corresponding to a user input to the external device through the communication interface, and
a power control module which controls supply of the electrical energy obtained by the energy harvester to the power supplier.

10. The remote controller of claim 1, wherein the power supplier includes a over-discharge protection circuit, and wherein the processor is further configured to:
based on a first supply voltage of the power supplier obtained at a point in time before the electrical energy obtained by the energy harvester is supplied to the power supplier being greater than a second supply voltage of the power supplier obtained after a threshold time from a point in time when the electrical energy obtained by the energy harvester is supplied to the power supplier, control the over-discharge protection circuit to cut off power supply of the power supplier.

11. The remote controller of claim 10, wherein the processor is further configured to:
based on the supply voltage of the power supplier being greater than or equal to the second threshold value and less than a third threshold value, output guide audio in relation to charging of the power supplier of the remote controller through a speaker of the external device.

12. A method of a remote controller to control an external device, the method comprising:
obtaining a supply voltage of a power supplier included in the remote controller;
based on the obtained supply voltage of the power supplier included in the remote controller being greater than or equal to a first threshold value and less than a second threshold value, releasing a current communication connection established to communicate with the external device and supplying an electrical energy obtained by an energy harvester included in the remote controller to the power supplier,
wherein the releasing of the current communication connection includes disconnecting a communication session established between the remote controller and the external device.

13. The method of claim 12, further comprising:
based on a supply voltage of the power supplier, after the communication connection is released, being less than the first threshold value, controlling an over-discharge protection circuit included in the power supplier to cut off power supply of the power supplier.

14. The method of claim 12, further comprising:
based on the supply voltage of the power supplier being greater than or equal to the second threshold value and less than a third threshold value, transmitting, to the external device, a signal to display a guide user interface (UI) in relation to charging of the power supplier of the remote controller on a display of the external device based on a user input received through a manipulation interface included in the remote controller.

15. The method of claim 14, further comprising:
based on the supply voltage of the power supplier being greater than or equal to the third threshold value and less than a fourth threshold value, transmitting, to the external device, a signal to display a guide UI in relation to charging of the power supplier of the remote controller on the display of the external device.

16. The method of claim 12, further comprising:
based on the supply voltage of the power supplier, after the communication connection is released, being greater than or equal to a fourth threshold value, re-establishing the communication connection with the external device.

17. The method of claim 12, further comprising:
based on the supply voltage of the power supplier being greater than or equal to the second threshold value and less than a third threshold value, outputting guide audio in relation to charging of the power supplier of the remote controller through a speaker of the external device.

* * * * *